(12) United States Patent
Shin et al.

(10) Patent No.: US 12,068,636 B2
(45) Date of Patent: Aug. 20, 2024

(54) STATOR FOR ROTATING ELECTRIC MACHINE WITH OVERLAPPING HAIRPIN COILS

(71) Applicant: LG Magna e-Powertrain Co., Ltd., Incheon (KR)

(72) Inventors: Hojun Shin, Seoul (KR); Jaemin Kim, Seoul (KR); Kyeonghwan Kim, Seoul (KR); Seokhwan Kim, Seoul (KR)

(73) Assignee: LG Magna e-Powertrain Co., Ltd., Seoul (KR)

( * ) Notice: Subject to any disclaimer, the term of this patent is extended or adjusted under 35 U.S.C. 154(b) by 492 days.

(21) Appl. No.: 17/423,025

(22) PCT Filed: Jul. 24, 2020

(86) PCT No.: PCT/KR2020/009752
§ 371 (c)(1),
(2) Date: Jul. 14, 2021

(87) PCT Pub. No.: WO2021/141196
PCT Pub. Date: Jul. 15, 2021

(65) Prior Publication Data
US 2022/0344983 A1    Oct. 27, 2022

(30) Foreign Application Priority Data
Jan. 8, 2020 (KR) .................. 10-2020-0002729

(51) Int. Cl.
*H02K 3/12* (2006.01)
*H02K 1/16* (2006.01)
(Continued)

(52) U.S. Cl.
CPC ............ *H02K 1/16* (2013.01); *H02K 3/12* (2013.01); *H02K 3/345* (2013.01); *H02K 15/064* (2013.01); *H02K 2213/03* (2013.01)

(58) Field of Classification Search
CPC ............ H02K 3/38; H02K 3/34; H02K 3/345; H02K 3/325; H02K 3/32; H02K 3/30;
(Continued)

(56) References Cited

U.S. PATENT DOCUMENTS 4,689,973 A * 9/1987 Hershberger ......... D06F 37/304
68/23.7
4,700,096 A * 10/1987 Epars ................... H02K 1/2773
310/156.61
(Continued)

FOREIGN PATENT DOCUMENTS

EP 1638189 9/2014
JP 2012034453 2/2012
(Continued)

*Primary Examiner* — Maged M Almawri
(74) *Attorney, Agent, or Firm* — Fish & Richardson P.C.

(57) ABSTRACT

A stator for a rotating electric machine according to one implementation of the present disclosure includes a stator core having a plurality of slots, and a stator coil formed by electrically connecting a plurality of hairpins inserted into the slots in a preset pattern, wherein the stator coil includes voltage distribution hairpins disposed in a voltage distribution section preset from an end to which power is to be input, wherein the voltage distribution hairpins include a plurality of first and protruding parts protruding from the plurality of slots and extending away from the stator core, wherein one of the plurality of first protruding parts and one of the plurality of second protruding parts are electrically coupled to form a coil pair, and wherein an insulating member is disposed between the first protruding parts and the second protruding parts to insulate between the first and second protruding parts.

17 Claims, 20 Drawing Sheets

(51) Int. Cl.
    *H02K 3/34*      (2006.01)
    *H02K 15/06*     (2006.01)
(58) Field of Classification Search
    CPC .. H02K 3/40; H02K 3/42; H02K 3/44; H02K
           3/50; H02K 2203/06; H02K 1/16; H02K
           3/12; H02K 15/064; H02K 2213/03
    USPC .................................... 310/214, 5, 201–208
    See application file for complete search history.

(56) References Cited

U.S. PATENT DOCUMENTS

| | | | | |
|---|---|---|---|---|
| 5,773,910 | A * | 6/1998 | Lange ...................... | H02K 1/27 310/90 |
| 6,323,572 | B1 * | 11/2001 | Kinoshita ............ | H02K 1/2791 310/156.55 |
| 7,262,526 | B2 * | 8/2007 | Shiga .................... | H02K 1/2791 310/156.28 |
| 7,521,828 | B2 * | 4/2009 | Ogawa ..................... | H02K 3/50 310/179 |
| 7,649,296 | B2 * | 1/2010 | Fukasaku ................. | H02K 3/38 29/606 |
| 7,768,162 | B2 * | 8/2010 | Asao ...................... | H02K 15/12 310/45 |
| 8,138,650 | B2 * | 3/2012 | Shiga ................... | H02K 1/2791 29/598 |
| 8,446,061 | B2 * | 5/2013 | Nakayama ............... | H02K 3/34 310/214 |
| 8,581,466 | B2 * | 11/2013 | Patel ....................... | H02K 3/12 310/201 |
| 8,907,540 | B2 * | 12/2014 | Hamer ..................... | H02K 3/38 310/201 |
| 9,837,869 | B2 * | 12/2017 | Hashimoto ............ | H02K 3/522 |
| 10,090,723 | B2 * | 10/2018 | Hashimoto ............ | H02K 1/02 |
| 10,491,067 | B2 * | 11/2019 | Fraser ..................... | B60L 50/51 |
| 2002/0041129 | A1 * | 4/2002 | Oohashi ................... | H02K 3/50 310/179 |
| 2002/0043886 | A1 * | 4/2002 | Fujita ..................... | H02K 3/12 310/201 |
| 2003/0214190 | A1 * | 11/2003 | Congdon ........... | H02K 15/0081 310/71 |
| 2004/0164637 | A1 * | 8/2004 | Seguchi ................... | H02K 3/28 310/201 |
| 2005/0258703 | A1 * | 11/2005 | Kouda ..................... | H02K 3/28 310/180 |
| 2006/0103253 | A1 * | 5/2006 | Shiga ..................... | H02K 15/03 310/43 |
| 2008/0093948 | A1 * | 4/2008 | Naganawa ........... | H02K 15/045 310/203 |
| 2008/0246354 | A1 * | 10/2008 | Asao ...................... | H02K 15/12 310/45 |
| 2009/0096314 | A1 * | 4/2009 | Atarashi ................ | H02K 16/02 310/156.53 |
| 2009/0200888 | A1 * | 8/2009 | Tanaka .................... | H02K 3/28 310/195 |
| 2010/0207466 | A1 * | 8/2010 | Endo ...................... | H02K 3/522 310/71 |
| 2010/0213885 | A1 * | 8/2010 | Ichiyama ............... | H02K 21/12 310/156.46 |
| 2011/0175472 | A1 * | 7/2011 | Koike ...................... | H02K 3/50 310/71 |
| 2011/0204742 | A1 * | 8/2011 | Nakayama ............. | H02K 3/345 310/215 |
| 2011/0215660 | A1 * | 9/2011 | Goto ...................... | H02K 5/203 310/53 |
| 2011/0285238 | A1 * | 11/2011 | Kusase .................. | H02K 16/04 310/156.48 |
| 2012/0019081 | A1 * | 1/2012 | Tamura .................... | H02K 3/50 310/43 |
| 2012/0200187 | A1 * | 8/2012 | Sano .................... | H02K 1/2766 310/156.07 |
| 2012/0223598 | A1 * | 9/2012 | Matsuhisa ............... | H02K 15/12 29/598 |
| 2012/0228965 | A1 * | 9/2012 | Bang ...................... | H02K 21/12 310/156.02 |
| 2013/0049515 | A1 * | 2/2013 | Hisada .................... | H02K 3/38 310/198 |
| 2013/0069474 | A1 * | 3/2013 | Hamer ..................... | H02K 3/34 174/110 SR |
| 2013/0093276 | A1 * | 4/2013 | Kim ...................... | H02K 16/00 310/114 |
| 2013/0127288 | A1 * | 5/2013 | Hamer ..................... | H02K 3/38 310/195 |
| 2013/0270955 | A1 * | 10/2013 | Lillington ............... | H02K 21/22 29/598 |
| 2013/0307363 | A1 * | 11/2013 | Sano ..................... | H02K 1/2766 310/156.01 |
| 2014/0042865 | A1 * | 2/2014 | Mourou .................. | B23K 26/342 29/596 |
| 2014/0065418 | A1 * | 3/2014 | Kikuchi ................. | H01B 7/0216 428/383 |
| 2015/0022045 | A1 * | 1/2015 | Hagiwara ................ | H02K 3/38 310/201 |
| 2015/0123503 | A1 * | 5/2015 | Hashimoto ............ | H02K 3/522 310/71 |
| 2015/0162793 | A1 * | 6/2015 | Hashimoto ............ | H02K 3/522 310/208 |
| 2015/0229176 | A1 * | 8/2015 | Tamura ................... | H02K 3/34 310/201 |
| 2016/0301274 | A1 * | 10/2016 | Kojima .................. | H02K 3/34 |
| 2017/0126086 | A1 * | 5/2017 | Nagai .................... | H02K 1/146 |
| 2019/0267861 | A1 * | 8/2019 | Nakayama ............. | H02K 3/12 |
| 2020/0212750 | A1 * | 7/2020 | Sheu ..................... | H02K 3/42 |
| 2023/0026208 | A1 * | 1/2023 | Kamegawa ............. | H02K 3/28 |
| 2023/0275483 | A1 * | 8/2023 | Sadiku ............... | H02K 15/0421 310/215 |

FOREIGN PATENT DOCUMENTS

| | | |
|---|---|---|
| JP | 2017118629 | 6/2017 |
| JP | 6402257 | 10/2018 |
| KR | 1020190072092 | 6/2019 |
| KR | 1020190133973 | 12/2019 |

* cited by examiner

STATOR FOR ROTATING ELECTRIC MACHINE WITH OVERLAPPING HAIRPIN COILS

CROSS-REFERENCE TO RELATED APPLICATIONS

This application is a National Stage application under 35 U.S.C. § 371 of International Application No. PCT/KR2020/009752, filed on Jul. 24, 2020, which claims the benefit of Korean Application No. 10-2020-0002729, filed on Jan. 8, 2020. The disclosures of the prior applications are incorporated by reference in their entirety.

TECHNICAL FIELD

The present disclosure relates to a stator of a rotating electric machine.

BACKGROUND

A rotating electric machine is an apparatus that converts electrical energy into mechanical energy or mechanical energy into electrical energy.

As is well known, a rotating electric machine is configured as an electric motor, a generator or a generator-combined electric motor.

A stator is provided with a stator coil for supplying electricity, and the stator coil is wound in the stator through a plurality of slots formed in the stator.

A rotating electric machine includes a stator and a rotor that is rotatably disposed in the stator.

The stator includes a stator core having slots and teeth, and a stator coil wound by being inserted into the slots.

In order to increase an output of a rotating electric machine, it is preferable to increase a ratio of a cross-sectional area of a conductor of a stator coil to a cross-sectional area of a slot.

In consideration of this, a conductor segment or a hairpin magnet wire (hereinafter, referred to as "hairpin"), which is formed by bending a flat-type copper wire with a relatively large cross-sectional area of a conductor into a "U" shape, is used for some of the related art stators.

A stator using hairpins is wound with a stator coil formed by connecting a plurality of hairpins, which is inserted into slots, in a preset pattern.

A process of winding a plurality of hairpins is as follows.

The hairpin includes a pair of insertion parts to be inserted into different slots, and a connection part connecting the pair of insertion parts.

When the pair of insertion parts is inserted into the slots, one side of each of the pair of insertion parts protrudes to one side of the stator core. The protruded portions of the insertion parts are referred to as protruding parts.

The insertion parts are spaced apart from one another in a radial direction in the slots to form layers, and a protruding part extends from the insertion part inserted in each layer.

An insulating coating film is stripped from an end of the protruding part for coupling, and two protruding parts which protrude from different slots and different layers are electrically coupled to form a coil pair. Accordingly, different hairpins are electrically connected.

The coil pair is provided in plurality in a radial direction and a circumferential direction of the stator core. There is a risk of insulation breakdown (or electrical breakdown) due to discharge between coupling portions of coil pairs spaced apart from each other in the radial direction.

In consideration of this point, techniques for suppressing discharge by inserting insulating paper between coil pairs spaced apart from each other in the radial direction have been introduced.

However, coil pairs disposed adjacent to each other in the circumferential direction other than in the radial direction, their protruding parts partially overlap in the radial direction. When a voltage applied to the stator coil increases, partial discharge may occur between partially-overlapped portions due to a high voltage surge.

In particular, when a voltage distribution ratio is high due to a direct connection between the coil pairs and an external power source, an occurrence rate of partial discharge due to the high voltage surge between the partially-overlapped protruding parts may increase upon starting the stator.

Korean Patent Publication No. 10-2017-0173161 discloses a stator core having an insulating member between coil pairs spaced apart from each other in a radial direction. Specifically, an insulating ring is provided between the coil pairs spaced apart from each other in the radial direction, thereby suppressing discharge between portions from which the insulating coating film has been stripped.

However, since a separate insulating member is not provided between adjacent protruding parts in the stator core, the partial discharge due to the high voltage surge may occur when a voltage applied to the stator coil increases.

SUMMARY

The present disclosure is directed to a stator for an electric motor having a structure capable of solving the aforementioned problems.

First, one aspect of the present disclosure is to provide a stator for a rotating electric machine having a structure capable of suppressing partial discharge by securing insulation performance.

Another aspect of the present disclosure is to provide a stator for a rotating electric machine having a structure capable of suppressing an occurrence of partial discharge between stator coils when a voltage applied to the stator coils is increased.

Still another aspect of the present disclosure is to provide a stator for a rotating electric machine having a structure capable of suppressing an occurrence of partial discharge between stator coils having a large voltage distribution ratio among stator coils when the stator is started.

Still another aspect of the present disclosure is to provide a stator for a rotating electric machine having a structure capable of reducing a size of an insulating member disposed to suppress an occurrence of partial discharge, so as to suppress the occurrence of the partial discharge and simultaneously reduce a manufacturing cost of the insulating member.

A stator for a rotating electric machine according to the present disclosure may include a stator core having a plurality of slots. The stator may also include a stator coil formed by inserting a plurality of hairpins into the plurality of slots and electrically connecting the plurality of hairpins in a preset pattern.

Hairpins disposed in a section having a relatively high voltage distribution ratio may include a plurality of protruding parts protruding to one side of the stator coil and electrically coupled to each other. An insulating member may be disposed between the protruding parts coupled to each other.

Specifically, hairpins disposed in a section having a high voltage distributing ratio may include a plurality of first protruding parts and a plurality of second protruding parts that are electrically coupled to each other so as to form coil pairs. An insulating member may be disposed between the first protruding parts and the plurality of second protruding parts to insulate between the first protruding parts and the second protruding parts.

The coil pair may be provided in plurality along a circumferential direction of the stator core. Any one of the plurality of coil pairs may form an overlap region by partially overlapping another one of the plurality of coil pairs in a radial direction of the stator core.

Among portions of the overlap region, a portion located farthest from the stator core may be located adjacent to the stator core than one side of the insulating member which is located farthest from the stator core.

The stator for the rotating electric machine may include a stator core having a plurality of slot, and a stator coil formed by electrically connecting a plurality of hairpins inserted into the slots in a preset pattern.

The stator coil may include voltage distribution hairpins disposed in a voltage distribution section preset from an end to which power is to be input.

The voltage distribution hairpins may include a plurality of first protruding parts and second protruding parts protruding from the plurality of slots and extending in a direction away from the stator core.

An insulating member may be disposed between the first protruding parts and the plurality of second protruding parts to insulate between the first protruding parts and the second protruding parts.

The plurality of first protruding parts may be located at a radially outermost side of the stator core, and the plurality of second protruding parts may be located adjacent to the plurality of first protruding parts at a radially inner side of the plurality of first protruding parts.

Each of the plurality of first protruding parts may include a first inclined portion extending to one side in the circumferential direction of the stator core at a predetermined angle with one side surface of the stator core.

Each of the plurality of second protruding parts may include a second inclined portion extending to another side opposite to the one side in the circumferential direction of the stator core at a predetermined angle with the one side surface of the stator core.

The first inclined portion may form an overlap region by partially overlapping the second inclined portion in the radial direction of the stator core.

Among portions where the first inclined portion and the second inclined portion partially overlap each other, portions located farthest from the stator core may be located more adjacent to the stator core than one side of the insulating member located farthest from the stator core.

The first protruding part and the second protruding part forming the coil pair may protrude from different slots, and the coil pair may be provided in plurality along the circumferential direction of the stator core.

Any one of the plurality of coil pairs may form an overlap region by partially overlapping another one of the plurality of coil pairs in the radial direction of the stator core.

Among portions of the overlap region, a portion located farthest from the stator core may be located adjacent to the stator core than one side of the insulating member which is located farthest from the stator core.

The first protruding part forming the coil pair may include a first inclined portion extending to one side in the circumferential direction of the stator core at a predetermined angle with one side surface of the stator core, and a first wire connection portion extending from one end of the first inclined portion in a direction away from the plurality of slots.

The second protruding part forming the coil pair may include a second inclined portion extending to another side opposite to the one side in the circumferential direction of the stator core at a predetermined angle with the one side surface of the stator core, and a second wire connection portion extending from one end of the second inclined portion in the direction away from the plurality of slots, and electrically coupled to the first wire connection portion.

The first inclined portion of any one of the plurality of coil pairs may form an overlap region by partially overlapping the second inclined portion of another one of the plurality of coil pairs in the radial direction of the stator core.

Among portions of the overlap region, a portion located farthest from the stator core may be spaced apart from the stator core by a first distance, and one side of the insulating member located farthest from the stator core may be spaced apart from the stator core by a second distance.

Here, the first distance may be equal to or shorter than the second distance.

The insulating member may be formed in an annular shape along the circumferential direction of the stator core.

The stator coil may include first to n-th coil parts each having a plurality of hairpins, and the first coil part may include the voltage distribution hairpins.

The stator coil may include first to n-th coil parts each having a plurality of hairpins, and the first coil part and a second coil part connected to the first coil part may be each provided with the voltage distribution hairpins.

The stator coil may include first to n-th coil parts each having a plurality of hairpins, and the voltage distribution section may include the first coil part having a voltage distribution ratio of 60% or higher.

The stator coil may include first to n-th coil parts each having a plurality of hairpins, and the voltage distribution section may include the first coil part having a voltage distribution ratio of 50% or higher and a second coil part connected to the first coil part.

A stator for a rotating electric machine according to the present disclosure may include a stator core having a plurality of slots, and a stator coil formed by electrically connecting a plurality of hairpins inserted through the plurality of slots, respectively.

The stator coil may include a protruding part protruding in a direction away from the plurality of slots, and the protruding part may be provided in plurality to be disposed along the radial direction of the stator core.

The plurality of protruding parts may include a plurality of first protruding parts located at a radially outermost side of the stator core, and a plurality of second protruding parts located adjacent to the plurality of first protruding parts at a radially inner side of the plurality of first protruding parts.

Some of the plurality of first protruding parts may be electrically connected to an external power source, and an insulating member may be disposed between the first protruding parts and the plurality of second protruding parts to insulate between the first protruding parts and the second protruding parts.

A rest of the plurality of first protruding parts may be coupled to the plurality of second protruding parts, respectively, to form a plurality of coil pairs, and the first protruding part and the second protruding part forming each coil pair may protrude from different slots.

Any one of the plurality of coil pairs may partially overlap another one of the plurality of coil pairs in the radial direction of the stator core. Among partially-overlapped portions between the one coil pair and the another coil pair of the plurality of coil pairs, a portion located farthest from the stator core may be located more adjacent to the stator core than one side of the insulating member located farthest from the stator core.

Effects that can be obtained by the technical solution of the present disclosure will be described as follows.

First, an insulating member may be provided between hairpins to which power of different phases is applied and which partially overlap in a radial direction.

With the configuration, insulation performance can be secured between the hairpins to which the power of different phases is applied and which partially overlap in the radial direction, and the probability of an occurrence of partial discharge can be remarkably reduced.

Since the hairpins to which the power of different phases is applied and which partially overlap in the radial direction are blocked from one another by the insulating members, the probability of the occurrence of the partial discharge due to a high voltage surge can be significantly reduced.

In addition, among hairpins arranged in a section having a relatively high voltage distribution ratio, an insulating member may be disposed between hairpins to which power of different phases is applied and which partially overlap in the radial direction.

With the configuration, when the stator is started, the probability of the occurrence of the partial discharge due to the high voltage surge between the hairpins partially overlapping in the radial direction can be significantly reduced.

In addition, when a portion where a hairpin to which power of one phase is applied and a hairpin to which power of another phase is applied overlap each other in a radial direction is referred to as an overlap region, the insulating member may be configured to block between the hairpins in all overlap regions.

With the configuration, the probability of the occurrence of the partial discharge due to the high voltage surge can be significantly reduced.

In addition, one side of the insulating member located farthest from a stator core and a portion of an overlap region located farthest from the stator core may be spaced apart from the stator core by the same distance.

Accordingly, the hairpins can all be blocked from one another in all overlap regions and simultaneously the insulating member can be reduced in size.

That is, the probability of the occurrence of the partial discharge due to the high voltage surge can be significantly reduced, and simultaneously a manufacturing cost of the insulating member can be reduced.

DETAILED DESCRIPTION

Hereinafter, a rotating electric machine according to an implementation of the present disclosure will be described in detail with reference to the accompanying drawings.

In the following description, a description of some constituent elements may be omitted in order to clarify the features of the present disclosure.

First, terms to be used will defined below.

The term "start" as used below refers to that a stator 10 is switched from a stopped (stationary) state to a dynamic state.

The term "operation" used below refers to that the stator 10 is maintained in the dynamic state after the stator 10 is started.

The terms "top" or "upper side" and "bottom" or "lower side" used below may be understood with reference to a direction indicated in FIG. 1.

The term "circumferential direction" used below refers to a rotating direction clockwise or counterclockwise centering on a central axis of the stator core 100.

The term "axial direction" used below refers to a direction of the central axis of the stator core 100.

The term "radially inner side" used below is defined based on one point, namely, refers to an area having a distance to the central axis of the stator core 100 which is shorter than a distance from the one point to the central axis.

The term "radially outer" used below is defined based on the one point, namely, refers to an area having a distance to the central axis of the stator core 100 which is greater than a distance from of the one point to the central axis.

Figure 1:
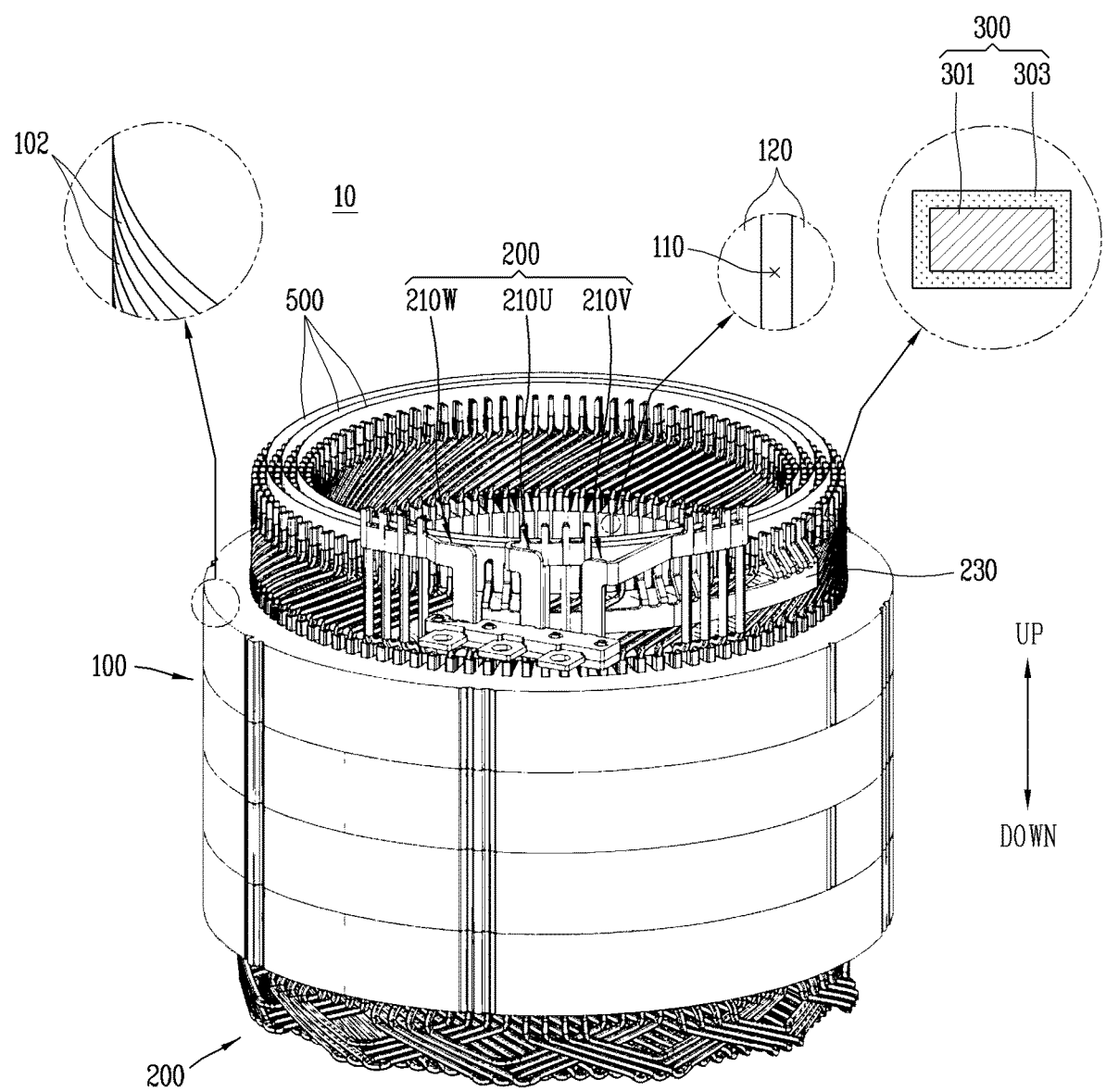
FIG. 1 is a perspective view illustrating a stator core in accordance with an implementation of the present disclosure.
Figure 2:
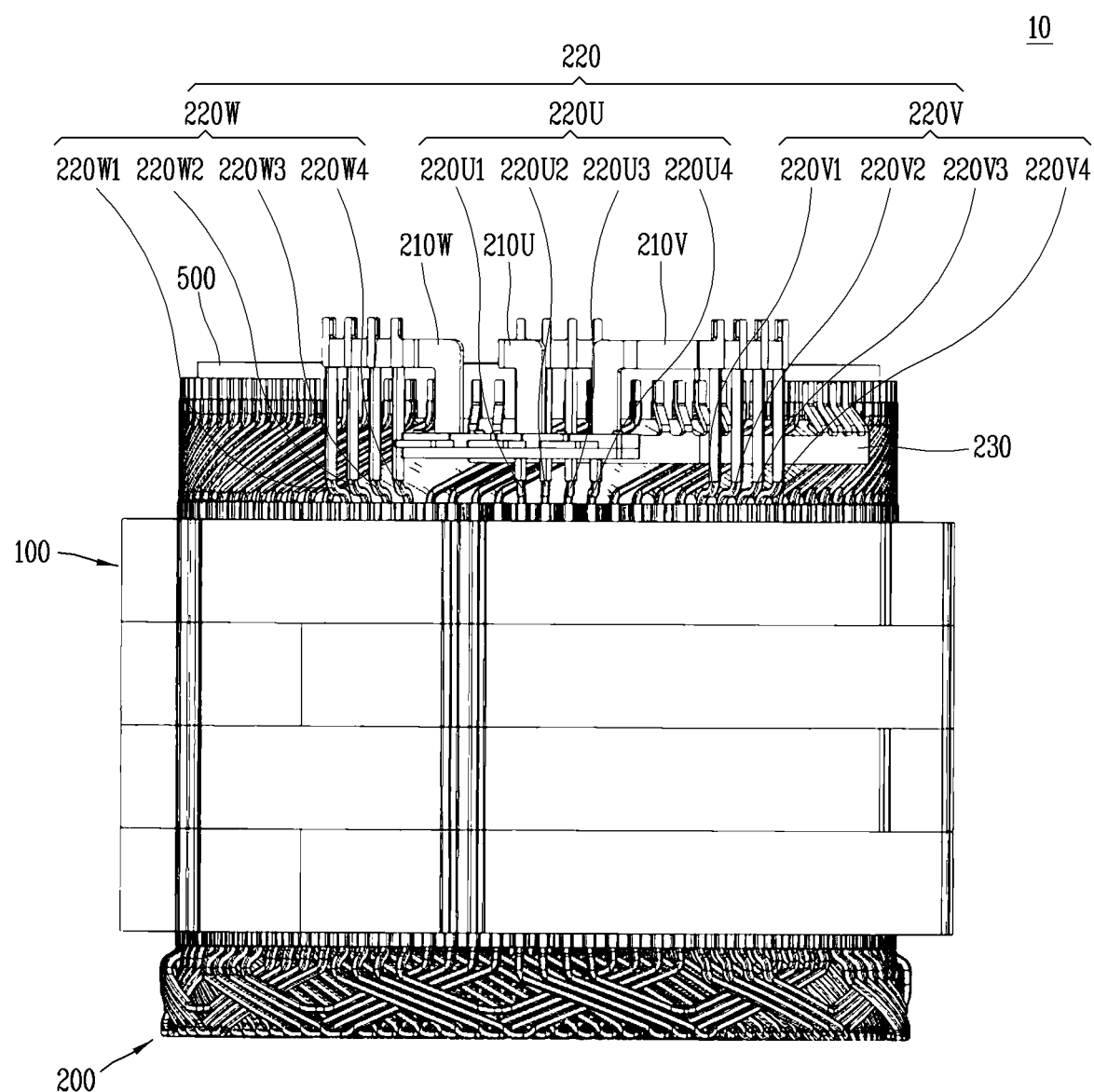
FIG. 2 is a front view of FIG. 1.
Figure 3:
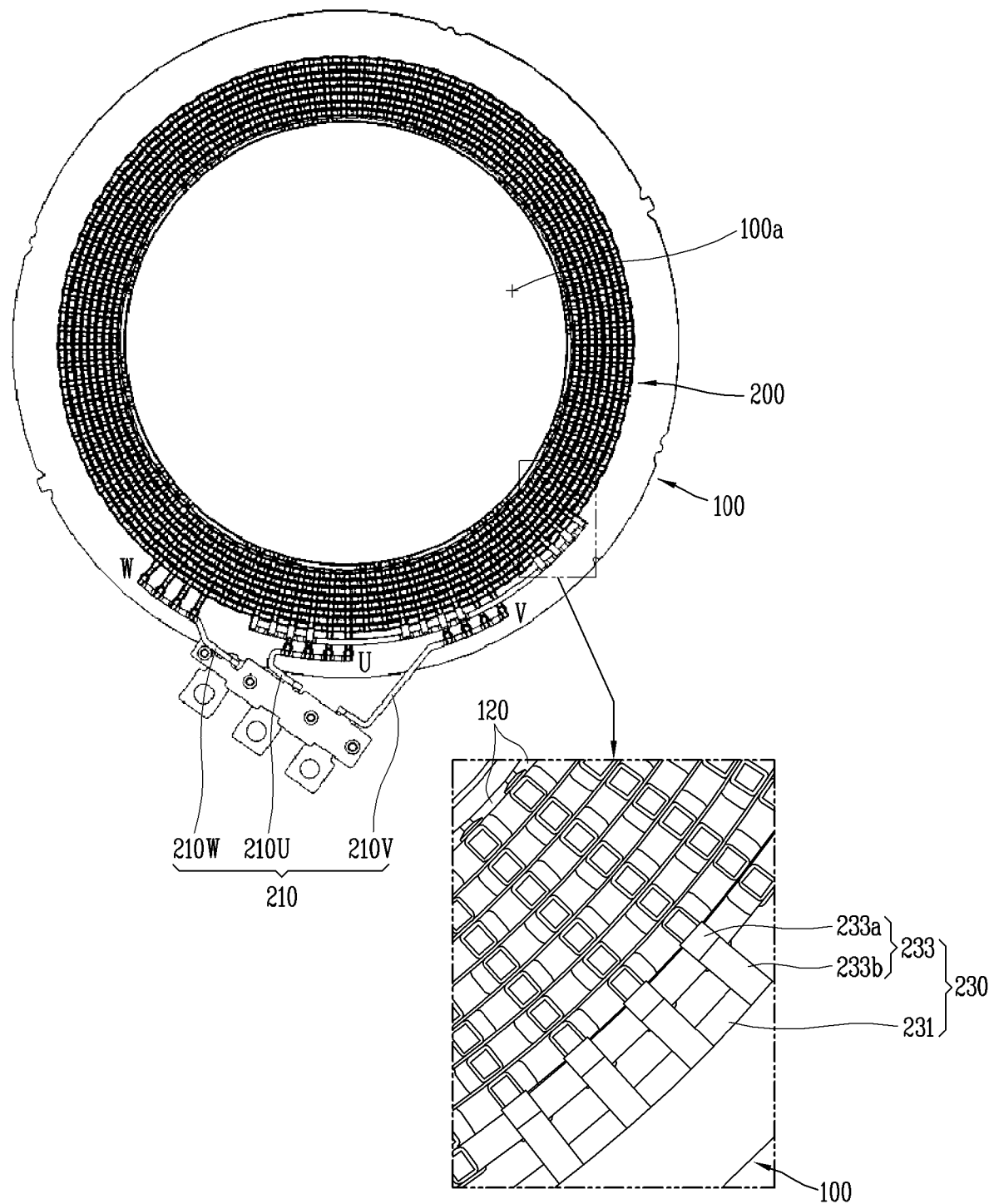
FIG. 3 is a planar view of FIG. 1.
Figure 4:
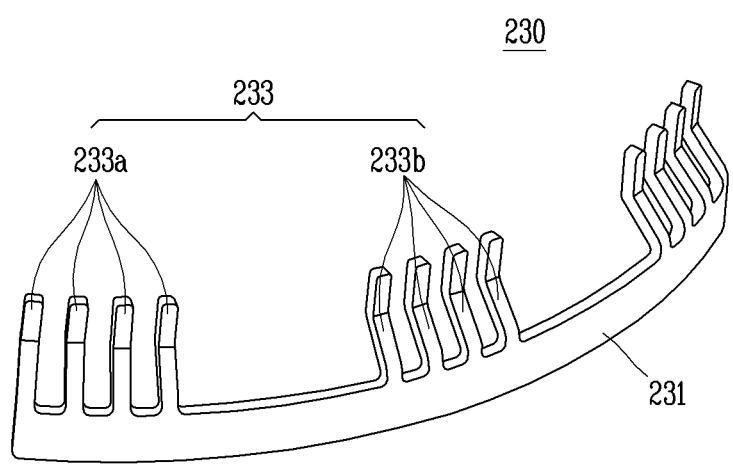
FIG. 4 is a perspective view of a neutral line of FIG. 1.

FIG. 1 is a perspective view illustrating a stator core in accordance with an implementation of the present disclosure. FIG. 2 is a front view of FIG. 1. FIG. 3 is a planar view of FIG. 1. FIG. 4 is a perspective view of a neutral wire of FIG. 1.

As illustrated in FIGS. 1 to 4, a stator 10 for a rotating electric machine according to an implementation may include a stator core 100 and a stator coil 200 wound around the stator core 100.

The stator core 100 may substantially have a circular cross-section and extend in one direction (a top-bottom (up-down) direction in the implementation illustrated in FIG. 1).

The stator core 100 may be provided with a rotor receiving hole 100a formed through its inside such that a rotor (not shown) is rotatably received.

The stator core 100 may further include a plurality of slots 110 and teeth 120. The plurality of slots 110 and the plurality of teeth 120 may alternately be disposed along a circumferential direction of the stator core 100.

In other words, two slots 110 adjacent to each other in the circumferential direction of the stator core 100 may be spaced apart from each other with a tooth 120 therebetween. An interval between two adjacent slots 110 may be defined as one pitch interval.

The stator core 100 may be formed by stacking and insulating a plurality of electrical steel sheets 102 in one direction (top-bottom direction in the implementation illustrated in FIG. 1).

The stator coil 200 may include a plurality of hairpins 300 to be inserted through the slots 110.

The stator coil 200 may be formed by winding the plurality of hairpins 300 inserted into the slots 110 in a preset pattern.

The plurality of hairpins 300 may form a plurality of coil pairs C (see FIG. 10) on one side of the stator coil 200 so as to be electrically connected.

Insulating members may be provided between adjacent coil pairs of the plurality of coil pairs C to insulate between the adjacent coil pairs C. The insulating member may include a first insulating member 400 (see FIG. 13) and a second insulating member 500 (see FIG. 21).

The stator coil 200 may include a power input part 210 for connecting phases of an external power source to phase-specific coil parts 220 to be described later. In one implementation, the external power source may be configured as an inverter for supplying power.

The power input part 210 may include phase power input parts connected to the phases of the external power source, respectively. In one implementation, the power input part 210 may include a U-phase power input part 210U connected to a U-phase of the external power source, a V-phase power input part 210V connected to a V-phase of the external power source, and a W-phase power input part 210W connected to a W-phase of the external power source.

The stator coil 200 may include a plurality of phase-specific coil parts 220 connected to the phase power input parts, respectively.

The plurality of phase-specific coil parts 220 may include, for example, a U-phase coil part 220U connected to the U-phase power input part 210U, a V-phase coil part 220V connected to the V-phase power input part 210V, and a W-phase coil part 220W connected to the W-phase power input part 210W.

Each of the phase-specific coil parts 220 may include a plurality of n-th phase-specific coil parts that are connected in parallel.

In this implementation, the U-phase coil part 220U may include a first U-phase coil part 220U1, a second U-phase coil part 220U2, a third U-phase coil part 220U3 and a fourth U-phase coil part 220U4 that are connected in parallel.

The V-phase coil part 220V may include a first V-phase coil part 220V1, a second V-phase coil part 220V2, a third V-phase coil part 220V3, and a fourth V-phase coil part 220V4 that are connected in parallel.

The W-phase coil part 220W may include a first W-phase coil part 220W1, a second W-phase coil part 220W2, a third W-phase coil part 220W3, and a fourth W-phase coil part 220W4 that are connected in parallel.

In the illustrated implementation, each of the phase-specific coil parts 220 is formed by connecting four n-th phase-specific coil parts in parallel, but the present disclosure is not limited thereto. Such structure may vary depending on a winding shape of the stator coil 200.

One end of each of the plurality of phase-specific coil parts 220, as aforementioned, may be electrically connected to the power input part 210. The one end of each of the phase-specific coil parts 220 connected to the power input part 210 may be disposed in an eighth layer (see FIG. 9) of the slot 110.

In addition, another end of each of the plurality of phase-specific coil parts 220 may be connected to a neutral wire 230 (see FIGS. 1 and 3). As illustrated in FIG. 4, the neutral wire 230 may include a body 231 in an arcuate shape, and phase-specific connection terminals 233 protruding from the body 231 to be connected to the another ends of the phase-specific coil parts 220.

Each of the phase-specific connection terminals 233 may include horizontal sections 233b bent toward a center of the stator core 100 to be connected to the another ends of the phase-specific coil parts 220, and vertical sections 233a extending from the horizontal section 233b in an axial direction.

The phase-specific connection terminals 233 may be connected to ends of the phase-specific coil parts 220 disposed in seventh layers (refer to FIG. 9) of the corresponding slots 110.

As enlarged in FIG. 3, the hairpins 300 may not be disposed in eighth layers of the slots 110 in which the horizontal sections 233b of the phase-specific connection terminals 233 of the neutral wire 230 are disposed.

Figure 5:
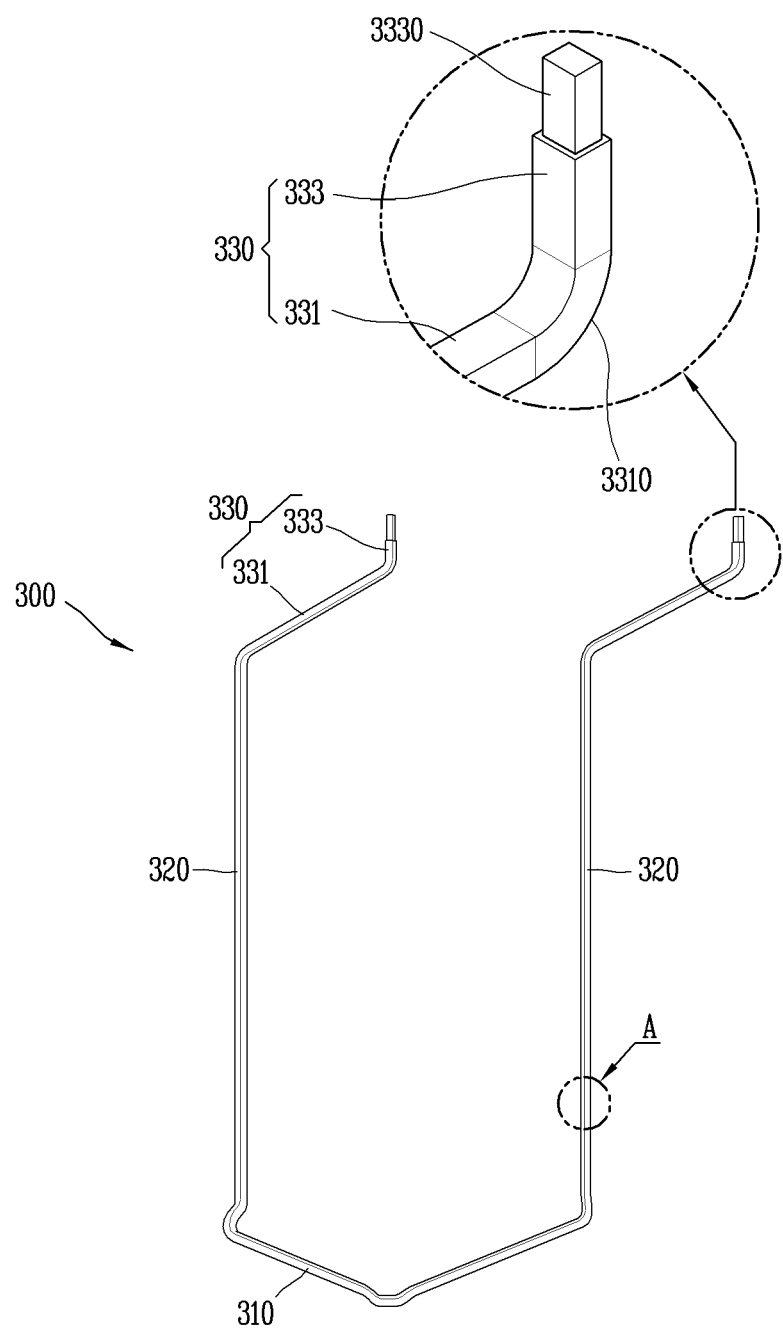
FIG. 5 is a perspective view of a hairpin of FIG. 1.
Figure 6:
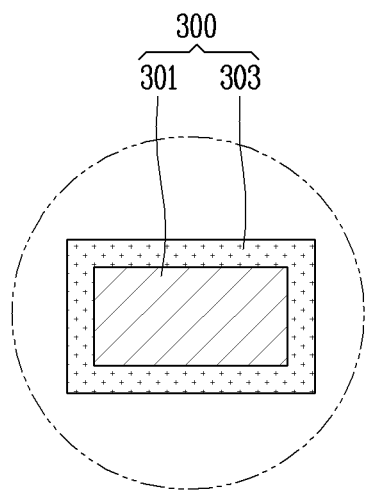
FIG. 6 is a sectional view of the hairpin of FIG. 5.

FIG. 5 is a perspective view of a hairpin of FIG. 1. FIG. 6 is a sectional view of the hairpin of FIG. 5.

As illustrated in FIGS. 5 and 6, the hairpin 300 may be formed by bending a predetermined length of conductor into a substantially "U" shape.

In addition, the hairpin 300 may include a conductor 301 having conductivity and an insulating coating film 303 covering the surface of the conductor 301.

In one implementation, the conductor 301 may have a rectangular cross section. The conductors 301 each having the rectangular cross section may be stacked in a layered form within the slot 110. This may result in increasing a ratio of an area of a conductor to an area of a slot.

In one implementation, the conductor 301 may be formed of a copper (Cu) material.

In one implementation, the insulating coating film 303 may be formed of a polyimide (PI) material.

In addition, the hairpin 300 may include a pair of insertion parts 320 inserted into the slots 110 and extending in one direction. The one direction may be defined as an "insertion direction" of the insertion part 320.

The insertion parts 320 may be formed such that a length in the insertion direction is longer than a length in an extending direction of the stator core 100. Accordingly, the insertion parts 320 may be inserted through the slots 110 of the stator core 100.

The pair of insertion parts 320 may be spaced apart from each other by a predetermined distance and inserted into different slots 110.

For example, the pair of insertion parts 320 may be inserted at a 12-slot pitch distance. In detail, when any one insertion part 320 is inserted into a first slot, another insertion part 320 may be inserted into a thirteenth slot spaced apart by a 12-slot pitch along the circumferential direction of the stator core 100.

In addition, the hairpin 300 may include a connection part 310 connecting one end of one of the pair of insertion parts 320 and one end of the other. In the illustrated implementation, the one end means a lower end.

The connection part 310 may be bent into an approximate "V" shape. However, the bent shape of the connection part 310 may vary depending on a wiring pattern of the stator coil 200.

The hairpin 300 may further include a pair of protruding parts 330 extending in one direction from another ends of the pair of insertion parts 320. In the illustrated implementation, the one direction refers to an upward direction, and the another end refers to an upper end.

The pair of protruding parts 330 may include inclined portions 331, respectively, which are bent in the circumferential direction of the stator core and extend at a predetermined angle with the insertion parts 320.

In the illustrated implementation, the pair of inclined portions 331 are all bent toward one side in the circumferential direction, but the pair of inclined portions 331 may alternatively be bent to the one side in the circumferential direction and/or to another side opposite to the one side.

In other words, the inclined portions 331 of the hairpin 300 used for wire connection may be bent in a clockwise and/or counterclockwise direction of the stator core, and the bent shape of the connection part 310 of the hairpin 300 used for the wire connection may be provided in various ways.

That is, various types of hairpins 300 having different inclined portions n331 and/or connection part 310 may be used.

The pair of protruding parts 330 may further have wire connection parts 333, respectively, each extending in one direction from one end of the corresponding inclined portion 331. In the illustrated implementation, the one end refers to an upper end of the inclined portion 331, and the one direction refers to an upward direction or an axial direction.

Specifically, as enlarged in FIG. 5, one end 3310 of the inclined portion 331 connected to the wire connection part 333 may be curved with a predetermined curvature. The wire connection part 333 may extend in the axial direction from the curved one end 3310 of the inclined portion 331.

A stripped portion 3330 from which the insulating coating film 303 has been removed may be formed by a predetermined length on an end portion of the wire connection part 333. The stripped portion 3330 of any one hairpin 300 may be electrically connected to the stripped portion 3330 of another hairpin 300, such that the two different hairpins 300 are electrically connected to each other. In one implementation, the two different stripped portions 3330 may be electrically coupled to each other in a welding manner. The two different stripped portions 3330 may be welded at a predetermined temperature. In one implementation, the predetermined temperature may be a temperature of 950° C. or higher.

The stripped portion 3330 may extend by a predetermined length along the axial direction. Since insulating performance is lowered at the stripped portion 3330 due to the removal of the insulating coating film 303, the stripped portion 3330 may preferably be as short as possible in length (or height).

However, if the length of the stripped portion 3330 is too short, there may be a risk that the insulating coating film 303 of the wire connection part 333 adjacent to the stripped portion 3330 is damaged during welding.

Therefore, the stripped portion 3330 may preferably be formed to be as short as possible in length, in consideration of the possibility of damage to the insulating coating film 303 during welding. In this regard, this will be described in detail later with reference to FIG. 18.

Referring back to FIG. 1, some of the hairpins 300 may be directly electrically connected to the power input parts 210. In this case, the hairpins 300 directly connected to the power input parts 210 may have protruding parts 330 that are bent outward in the radial direction of the hairpin 300 and extend after being axially bent again.

The hairpins 300 electrically connected directly to the power input parts 210 may be connected to other plural hairpins 300, thereby forming the phase-specific coil parts 220.

Figure 7:
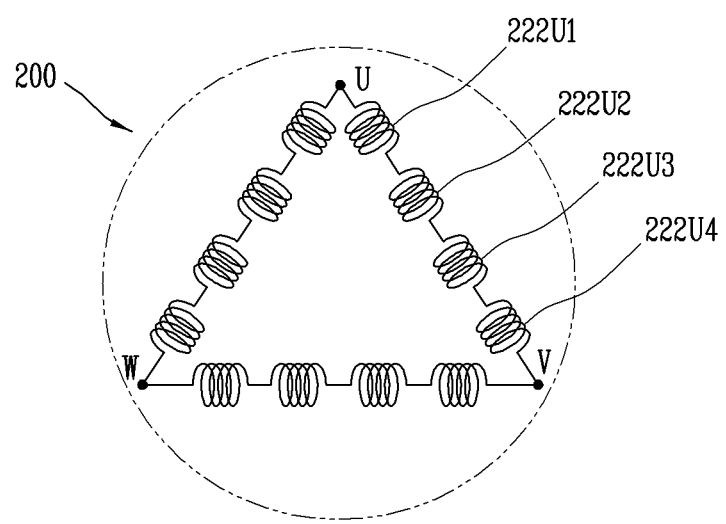
FIG. 7 is a schematic wiring diagram of the stator coil of FIG. 1.

FIG. 7 is a schematic wiring diagram of the stator coil of FIG. 1.

Referring to FIG. 7, the phase-specific coil parts 220 may be connected by a so-called triangular connection or delta connection in which three power sources with the same magnitude and a phase difference of 120 degrees are connected in a triangular shape.

Specifically, the U-phase coil part 220U, the V-phase coil part 220V, and the W-phase coil part 220W may be connected by a triangular connection or delta connection method.

The stator coil 200, for example, may be started by a delta connection, and may be operated by a wye connection.

Figure 8:
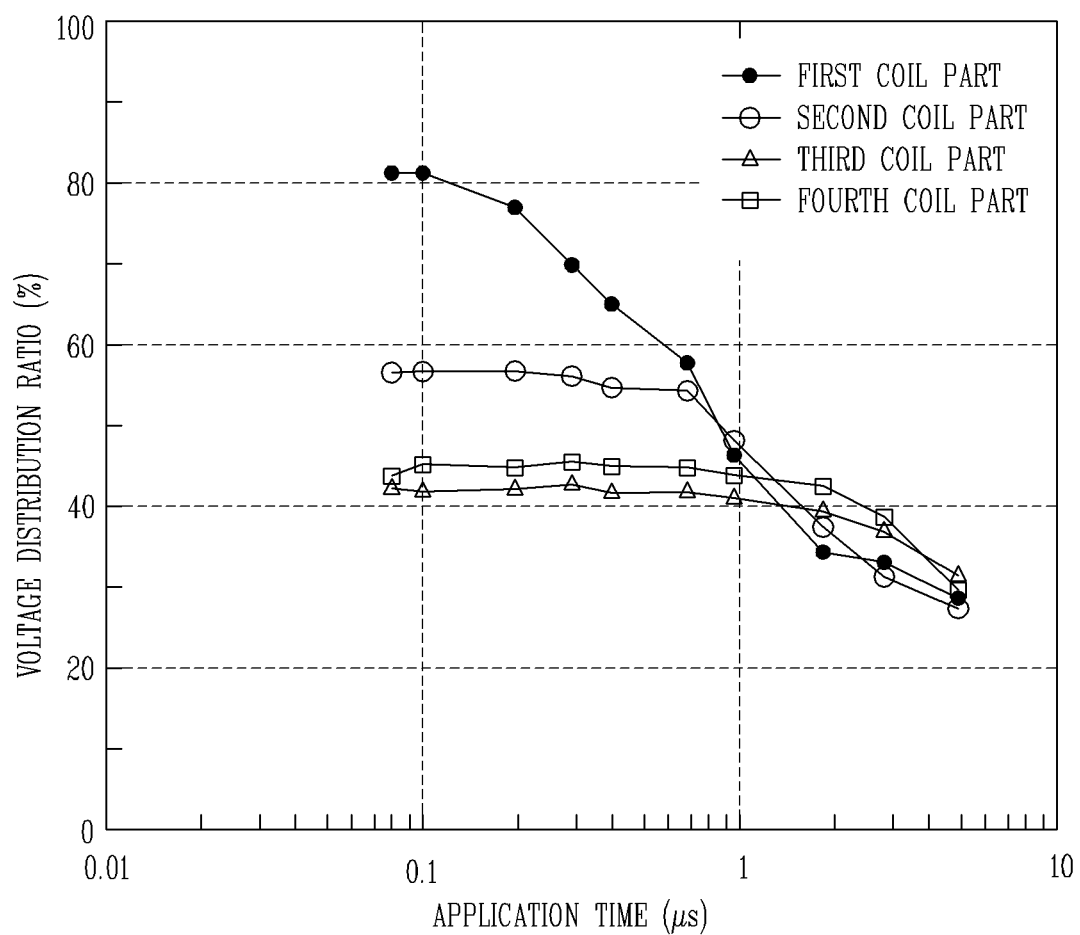
FIG. 8 is a graph showing a voltage distribution ratio of each coil part of FIG. 7.

FIG. 8 is a graph showing a voltage distribution ratio of each coil part of FIG. 7.

Referring to FIG. 8, the stator coil 200 may include a plurality of phase-specific coil parts 220, and each of the plurality of phase-specific coil parts 220 may include a plurality of partial coil parts connected in series to one another.

When the U-phase coil part 220U is described as an example, the partial coil parts of the U-phase coil part 220U may include a first coil part 222U1, a second coil part 222U2, a third coil part 222U3, and a fourth coil part 222U4.

Each of the first coil part 222U1, the second coil part 222U2, the third coil part 222U3, and the fourth coil part 222U4 may be provided with a preset number of hairpins 300.

Although the U-phase coil part 220U has been exemplarily described, the V-phase coil part 220V may include an n-th coil part (no reference numeral), and the W-phase coil part 220W may include an n-th coil part (no reference numeral).

When the U-phase coil part 220U is exemplarily described again, when power is applied to the stator coil 200, different distribution voltages may be applied to the first coil part 222U1, the second coil part 222U2, the third coil part 222U3, and the fourth coil part 222U4.

In more detail, the result of detecting a change in input voltage over time through an oscilloscope when power is applied to the stator coil 200 may be as follows.

The first coil part 222U1 connected to the power input part 210 of each phase-specific coil part 220 may have the highest voltage distribution ratio of 60% or higher, and the second coil part 222U2 connected to the first coil part 222U1 may have a voltage distribution ratio, which is higher than or equal to 50% and less than 60%.

In addition, the third coil part 222U3 connected to the second coil part 222U2 and the fourth coil part 222U4 connected to the third coil part 222U3 may have voltage distribution ratios, which are higher than or equal to 40% and less than 50%.

The stator coil 200 of the rotating electric machine according to one implementation of the present disclosure may include first hairpins (voltage distribution hairpins) 300a placed in a first section (voltage distribution section) preset from an end of the power input part 210 to which external power is to be input, and second hairpins 300b placed in a second section 110b after the first section (voltage distribution section) 110a.

Here, protruding parts 330a1 and 330a2 of the first hairpins (voltage distribution hairpins) 300a may partially overlap each other in the radial direction of the stator core 100. An insulating member may be provided between the partially-overlapped protruding parts 330a1 and 330a2 to suppress an occurrence of partial discharge from the overlapped portion.

Figure 9:
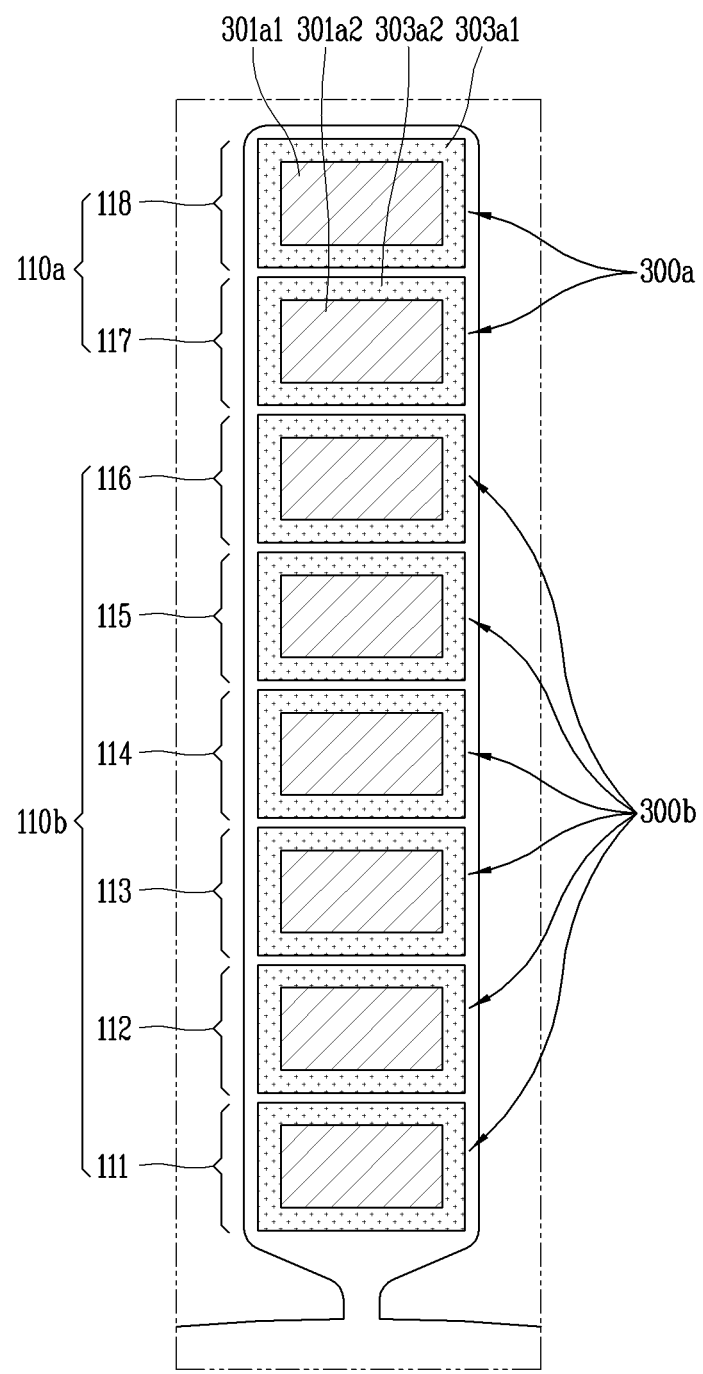
FIG. 9 is a sectional view illustrating an arrangement state of hairpins of FIG. 1 in a slot.

FIG. 9 is a sectional view illustrating an arrangement state of hairpins of FIG. 1 in a slot.

Referring to FIG. 9, the plurality of hairpins (insertion parts) may be inserted into the slot 110 of the stator core 100 and radially spaced apart from one another.

In other words, the plurality of hairpins (insertion parts) may be layered in the slot 110 so as to constitute a plurality of layers.

In detail, a position at which a hairpin (insertion part) disposed at the innermost side in the radial direction of the stator core 110 is inserted into the slot 110 may be defined as a first layer 111 of the slot 110.

In addition, a position at which a hairpin (insertion part) placed at the outermost side in the radial direction of the stator core 110 is inserted into the slot 110 may be defined as an eighth layer 118 of the slot 110.

Then, layers placed between the first layer 111 and the eighth layer 118 may be defined as a second layer 112 to a seventh layer 117 along the radial direction.

In the implementation, the hairpins (insertion parts) are placed in the slot 110 with forming the eight layers, but the number of layers may vary depending on the shape of the stator core 100. For example, the hairpins (insertion parts) may be disposed in the slot 110 while forming six layers along the radial direction.

As aforementioned, the stator coil 200 according to the implementation may include the first hairpin (voltage distribution hairpin) 300a placed in the first section (voltage distribution section) 110a, and the second hairpin 300b placed in the second section 110b after the first section (voltage distribution section) 110a.

Since the slots 110 are provided in plurality along the circumferential direction of the stator core 100, the first hairpin 300a and the second hairpin 300b may also be provided in plurality.

In this implementation, since the power input part 210 is located radially outside the slot 110, the eighth layer 118 and the seventh layer 117 placed at the radially outermost side of the slot 110 may form the first section (voltage distribution section) 110a.

The sixth layer 116, the fifth layer 115, the fourth layer 114, the third layer 113, the second layer 112, and the first layer 111 may form the second section 110b.

The first coil part 222U1 may be configured by the plurality of first hairpins 300a disposed in the first section 110a. In this case, the voltage distribution ratio of the first hairpins 330a disposed in the first section 110a may be set to 60% or higher.

In addition, the first coil part 222U1 and the second coil part 222U2 may be configured by the plurality of first hairpins 300a disposed in the first section 110a. In this case, the voltage distribution ratio of the first hairpins 330a disposed in the first section 110a may be set to 50% or higher.

Accordingly, when the stator 10 is started, a relatively high voltage may be distributed to the first hairpins 300a disposed in the first section 110a, and a relatively low voltage, compared to the first hairpins 300a, may be distributed to the second hairpins 300b disposed in the second section 110b.

Figure 10:
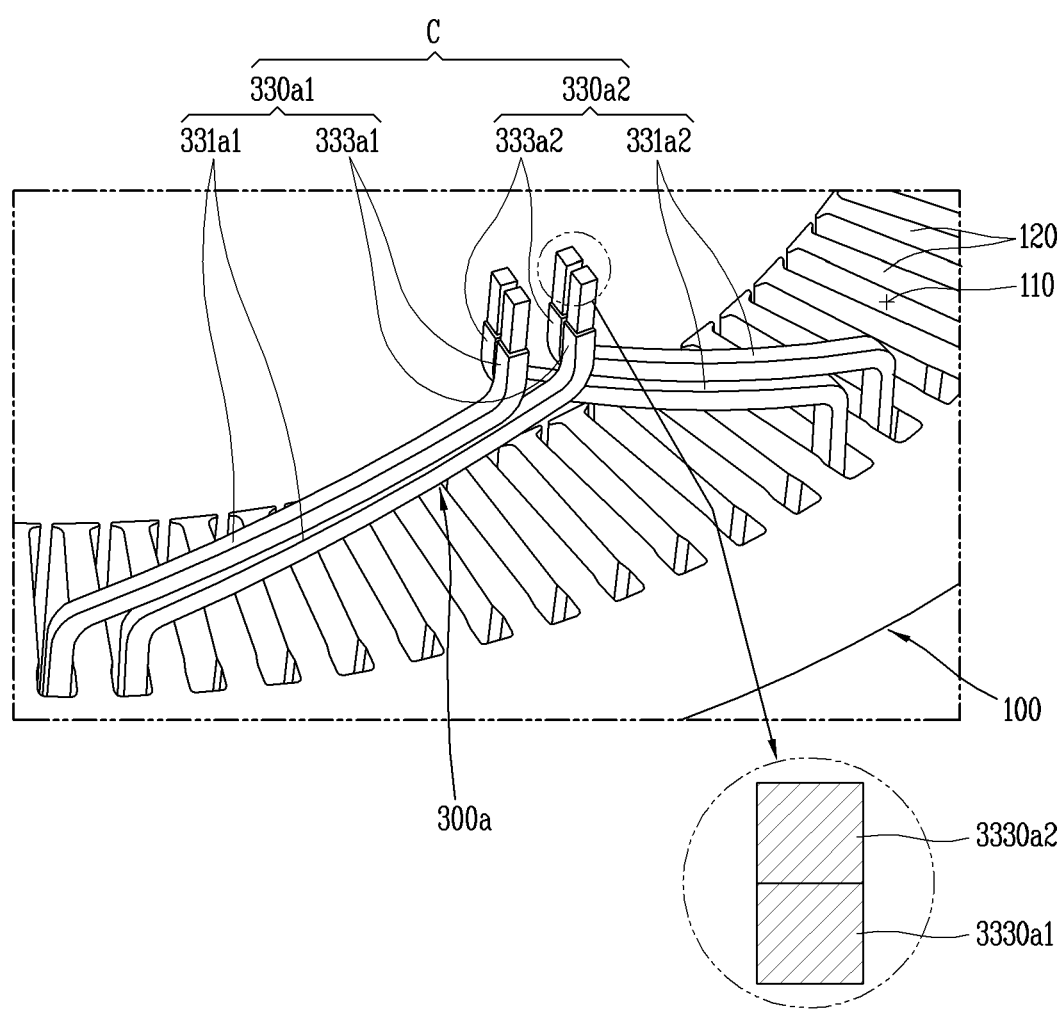
FIG. 10 is a perspective view illustrating a coupling structure of hairpins.

FIG. 10 is a perspective view illustrating a coupling structure of hairpins.

In FIG. 10, a coupling structure between different first hairpins 300a disposed in the first section 110a is shown. In order to clearly show the coupling structure, only some of the first hairpins 300a disposed in the first section 110a are illustrated and the rest is omitted.

Referring to FIG. 10, protruding parts 330a1 and 330a2 may protrude from the first section 110a and extend in a direction away from one side surface of the stator core 100. The one side surface of the stator core 100 may be defined as an upper side based on the direction shown in FIG. 1.

The first protruding part 330a1 may protrude from the eighth layer 118 that is the outermost side of the slot 110 in the radial direction, and extend in the direction away from the one side surface of the stator core 100.

In addition, the second protruding part 330a2 may protrude from the seventh layer 117, which is located at a radially inner side of the eighth layer 118 and adjacent to the eighth layer 118, and extend in the direction away from the one side surface of the stator core 100.

The first protruding part 330a1 may be provided in plurality along the circumferential direction of the stator core 100. In addition, the second protruding part 330a2 may be provided in plurality along the circumferential direction of the stator core 100.

However, in the illustrated implementation, in order to clearly show the coupling structure between the first protruding part 330a1 and the second protruding part 330a2, two first protruding parts 330a1 and two second protruding parts 330a2 are merely illustrated and the rest is omitted.

The first protruding part 330a1 may be bent to one side in the circumferential direction of the stator core 100 and extend at a predetermined angle with one side surface of the stator core 100. After that, the first protruding part 330a1 may be bent again in the axial direction and extend.

In detail, the first protruding part 330a1 may include a first inclined portion 331a1 extending to one side in the circumferential direction of the stator core 100 at a predetermined angle with the one side surface of the stator core 100.

In other words, the first inclined portion 331a1 may extend in a counterclockwise direction of the stator core at the predetermined angle with the one side surface of the stator core 100.

The first protruding part 330a1 may further include a first wire connection portion 333a1 that extends by being bent in the axial direction at an end of the first inclined portion 331a1.

In addition, a first stripped portion 3330a1 from which the insulating coating film 303a1 has been removed may be formed by a predetermined length on one end portion of the first connection portion 333a1.

The second protruding part 330a2 may be bent to another side in the circumferential direction of the stator core 100 and extend at a predetermined angle with the one side surface of the stator core 100. After that, the second protruding part 330a2 may be bent again in the axial direction and extend.

In detail, the second protruding part 330a2 may include a second inclined portion 331a2 extending to another side in the circumferential direction of the stator core 100 at a predetermined angle with the one side surface of the stator core 100.

In other words, the second inclined portion 331a2 may extend in a clockwise direction of the stator core at the predetermined angle with the one side of the stator core 100.

The second protruding part 330a2 may further include a second wire connection portion 333a2 that extends by being bent in the axial direction at an end of the second inclined portion 331a2.

In addition, a second stripped portion 3330a2 from which the insulating coating film 303a2 has been removed may be formed by a predetermined length on one end portion of the second connection portion 333a2.

The first protruding part 330a1 may be electrically coupled to the second protruding part 330a2 which protrudes from a different slot.

In the illustrated implementation, the first protruding part 330a1 and the second protruding part 330a2 coupled to each other may be disposed to be spaced apart from each other by a 12-slot pitch. When a slot 110 from which any one first protruding part 330a1 protrudes is referred to as a first slot, the second protruding part 330a2 coupled to the one first protruding part 330a1 may protrude from a thirteenth slot.

The first inclined portion 331a1 of the first protruding part 330a1 protruding from the first slot may extend to one side in the circumferential direction, and the first wire connection portion 333a1 extending from the first inclined portion 331a1 may be placed at one side of the seventh slot.

In addition, the second inclined portion 331a2 of the second protruding part 330a2 protruding from the thirteenth slot may extend to another side in the circumferential direction, and the second wire connection portion 333a2 extending from the second inclined portion 331a2 may be placed at one side of the seventh slot.

Here, the first wire connection portion 333a1 and the second wire connection portion 333a2 may overlap each other in the radial direction of the stator core 100, and the first stripped portion 3330a1 of the first wire connection portion 333a1 and the second stripped portion 3330a2 of the second wire connection portion 333a2 may be electrically coupled to each other.

In other words, the first stripped portion 3330a1 and the second stripped portion 3330a2, through which conductors are exposed, may be in surface-contact with each other, so as to be electrically coupled to each other. In one implementation, the first stripped portion 3330a1 and the second stripped portion 3330a2 may be electrically coupled to each other by welding.

The first protruding part 330a1 and the second protruding part 330a2 connected to each other through the process may form a coil pair C.

The coil pair C may be provided in plurality along the circumferential direction of the stator core 100. Here, the first inclined portion 331a1 of one coil pair C may partially overlap the second inclined portion 331a2 of another coil pair C in the radial direction of the stator core 100.

In the illustrated drawing, the first hairpin 300a has been described as an example, but the second hairpin 300b disposed in the second section 110b may also be coupled in a manner similar to that of the first hairpin 300a.

Specifically, the second hairpin 300b may include first protruding parts 330b1 protruding from the sixth layer 116, the fourth layer 114, and the second layer 112, and second protruding parts 330b2 protruding from the fifth layer 115, the third layer 113, and the first layer 111.

That is, the first protruding parts 330b1 and the second protruding parts 330b2 may alternately be disposed from the sixth layer 116 to the first layer 111.

In addition, each first protruding part 330b1 may include a first inclined portion 331b1 and a first wire connection portion 333b1, and each second protruding part 330b2 may include a second inclined portion 331b2 and a second wire connection portion 333b2.

One of the first protruding part 330b1 and one of the second protruding part 330b2 located at a radially inner side of the first protruding part 330b1 may be coupled to each other to form a coil pair C.

For example, any one of the first protruding parts 330b1 protruding from the sixth layers 116 and any one of the second protruding parts 330b2 protruding from the fifth layers 115 may be coupled to each other to form a coil pair C.

The coupling structure of the coil pair C of the second hairpins 300b will be understood by referring to the description of the coupling structure of the coil pair C of the first hairpins 300a, and a related description will not be repeated.

Figure 11:
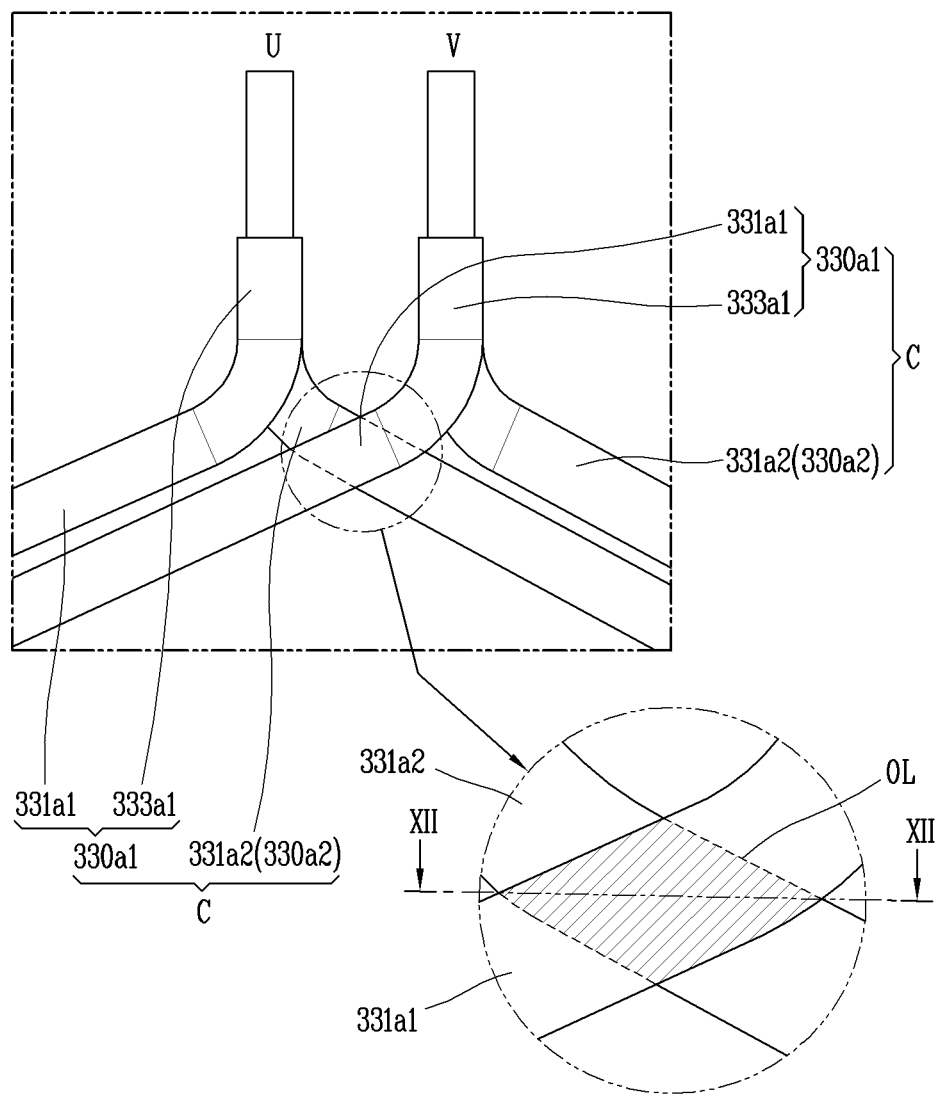
FIG. 11 is a front view illustrating a coupled portion of the hairpins of FIG. 10.

FIG. 11 is a front view illustrating a coupled portion of the hairpins of FIG. 10.

Referring to FIG. 11, two coil pairs C may be disposed adjacent to each other in the circumferential direction of the stator core 100.

The first inclined portion 331a1 of one of the two coil pairs C may partially overlap the second inclined portion 331a2 of the other coil pair C in the radial direction of the stator core 100. The partially-overlapped portion in the radial direction may be defined as an overlap region OL.

In the illustrated implementation, the coil pair C may be formed by coupling the first protruding part 330a1 protruding from the eighth layer 118 and the second protruding part 330a2 protruding from the seventh layer 117. In particular, since the two protruding parts 330a1 and 330a2 are further adjacent to be coupled to each other, the first inclined portion 331a1 of one of the coil pairs C and the second inclined portion 331a2 of the other coil pair C may be adjacent in the radial direction within the overlap region OL.

Here, when power of different phases is input to the two adjacent coil pairs C, the possibility of an occurrence of partial discharge may be increased because the first inclined portion 331a1 and the second inclined portion 331a2 to which the power of the different phases is input are adjacent to each other in the overlap region OL. In one implementation, U-phase power may be input to one of the two coil pairs C forming the overlap region OL and V-phase power may be input to the other coil pair C.

In addition, with the trend of applying a high voltage in an electric vehicle driving system, when a high voltage is applied due to an increase in voltage applied to the first inclined portion 331a1 and the second inclined portion 331a2, the probability of partial discharge due to a high voltage surge in the overlap region OL may be increased.

Further, as illustrated in the implementation, in the overlap region OL of the first hairpins 300a disposed in the first section 110a having a relatively high voltage distribution ratio, partial discharge may be caused due to a high voltage surge when the stator 10 is started.

In the illustrated implementation, only two coil pairs C adjacent to each other in the circumferential direction of the stator core 100 are shown, and thereby only one overlap region OL is generated.

However, in another implementation of the present disclosure, the coil pair C may be provided in plurality along the circumferential direction of the stator core 100, and thereby a plurality of overlap regions OL may be generated. This will be described in detail later.

Figure 12:
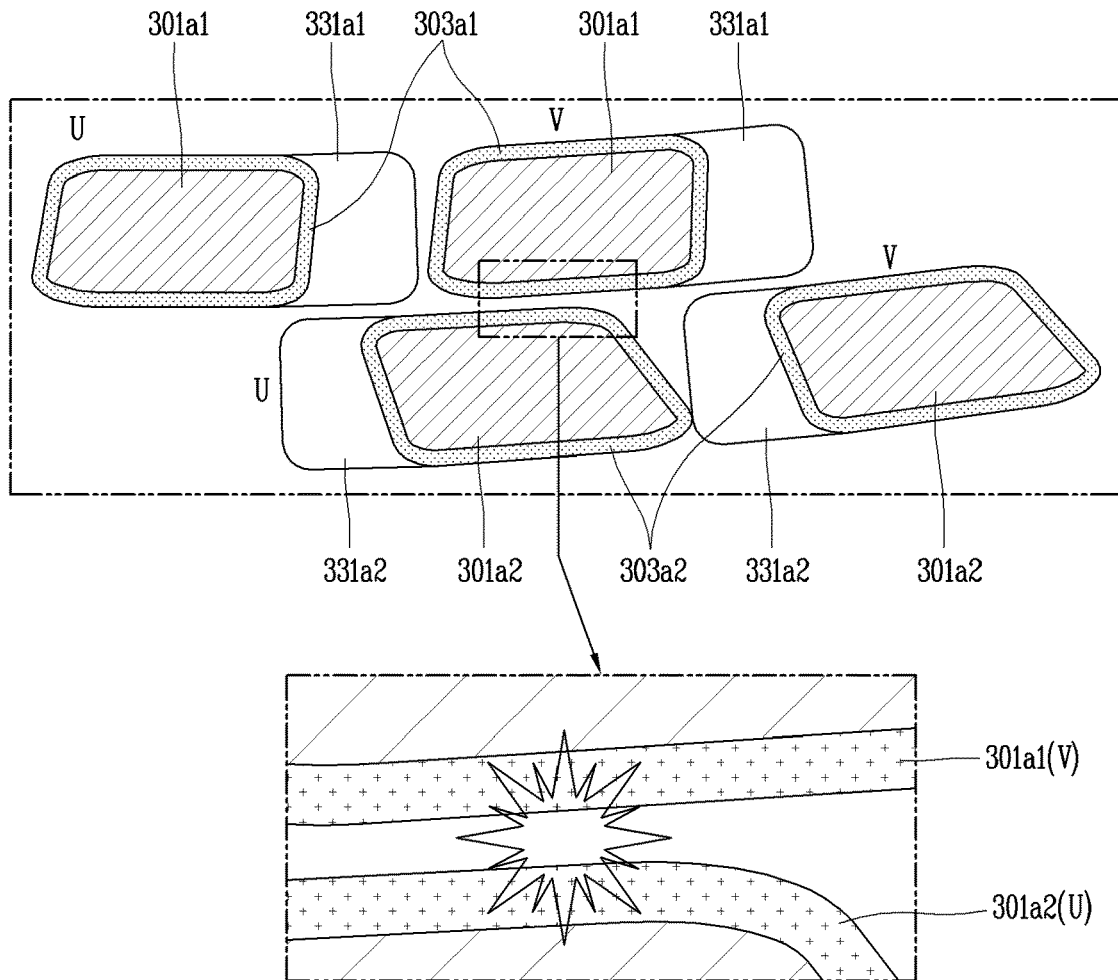
FIG. 12 is a sectional view taken along the line XII-XII of FIG. 11.

FIG. 12 is a sectional view taken along the line XII-XII of FIG. 11.

Referring to FIG. 12, cross-sections of coil pairs C adjacent to each other in an overlap region OL are shown.

As described above, an overlap region OL may be generated in the radial direction of the stator core 100 between the coil pairs C to which power of different phases is to be applied.

The first protruding part 330a1 and the second protruding part 330a2 forming the coil pair C may be located adjacent to each other in the radial direction of the stator core 100. Accordingly, the first inclined portion 331a1 and the second inclined portion 331a2 may be located adjacent to each other in the radial direction of the stator core 100 in the overlap region OL.

In the overlap region OL, the first inclined portion 331a1 and the second inclined portion 331a2 may be provided with insulating coating films 303a1 and 303a2 having insulating properties, respectively.

However, as described above, the first inclined portion 331a1 and the second inclined portion 331a2 connected to different phases are adjacent to each other in the radial direction of the stator core 100 within the overlap region OL. This may increase the probability that partial discharge occurs in the overlap region OL.

In addition, when a high voltage is applied due to an increase in applied voltage, the probability that partial discharge occurs due to a high voltage surge in the overlap region OL may be increased.

Further, in the overlap region OL of the first hairpins 300a disposed in the first section 110a having a relatively high voltage distribution ratio, partial discharge may be caused due to a high voltage surge when the stator 10 is started.

In consideration of this problem, an insulating member 400 for suppressing partial discharge from being caused due to a high voltage surge in the overlap region OL may be disposed between the first inclined portion 331a1 and the second inclined portion 331a2 of the first hairpin 300a.

Figure 13:
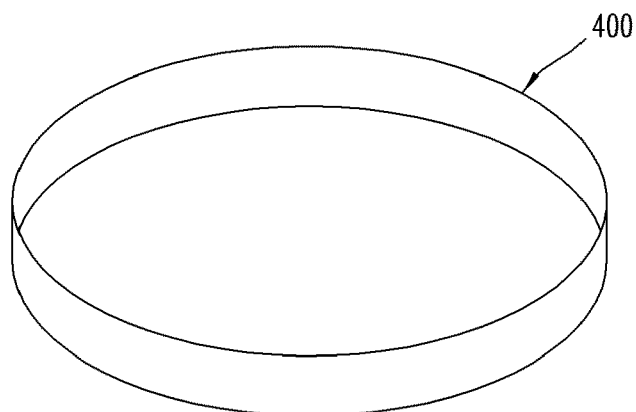
FIG. 13 is a perspective view of an insulating member of FIG. 1.

FIG. 13 is a perspective view of an insulating member 400 of FIG. 1.

Referring to FIG. 13, a first insulating member 400 for suppressing partial discharge due to a high voltage surge in the overlap region OL of the first hairpin 300a is illustrated.

The first insulating member 400 may have an annular cross-section and extend by a predetermined length along the axial direction of the stator core 100.

In one implementation, the first insulating member 400 may be configured as a member having insulating property.

In one implementation, the first insulating member 400 may be formed in a closed-loop shape extending along the circumferential direction of the stator core 100.

In one implementation, the first insulating member 400 may have a thickness which is substantially uniform in the radial direction of the stator core 100.

The first insulating member 400 may be inserted between the first inclined portion 331a1 and the second inclined portion 331a2 before the coil pair C is formed.

After the first insulating member 400 is inserted, the first wire connection portion 333a1 and the second wire connection portion 333a2 may be electrically coupled to each other, such that the plurality of first hairpins 300a can be electrically connected to each other.

As the plurality of first hairpins 300a is electrically connected, first coil parts may be formed. Specifically, the first coil part 222U1 of the U-phase coil part 220U, the first coil part (no reference numeral) of the V-phase coil part 220V, and the first coil part (no reference numeral) of the W-phase coil part 220W may be formed.

A plurality of overlap regions OL may be formed between adjacent first coil parts having different phases.

In the plurality of overlap regions OL, since the first coil parts having the different phases are blocked from each other by the first insulating member 400, insulating performance between the first coil parts having the different phases can be secured.

This may result in significantly reducing the probability that partial discharge occurs between the first coil parts having different phases in the overlap region OL.

Further, when a high voltage is applied, the occurrence of partial discharge between the first coil parts having the different phases can be suppressed.

In addition, when the stator 10 is started, the occurrence of partial discharge between the first coil parts having different phases among the first coil parts having a large voltage distribution ratio in the stator coil 200 can suppressed.

Figure 14:
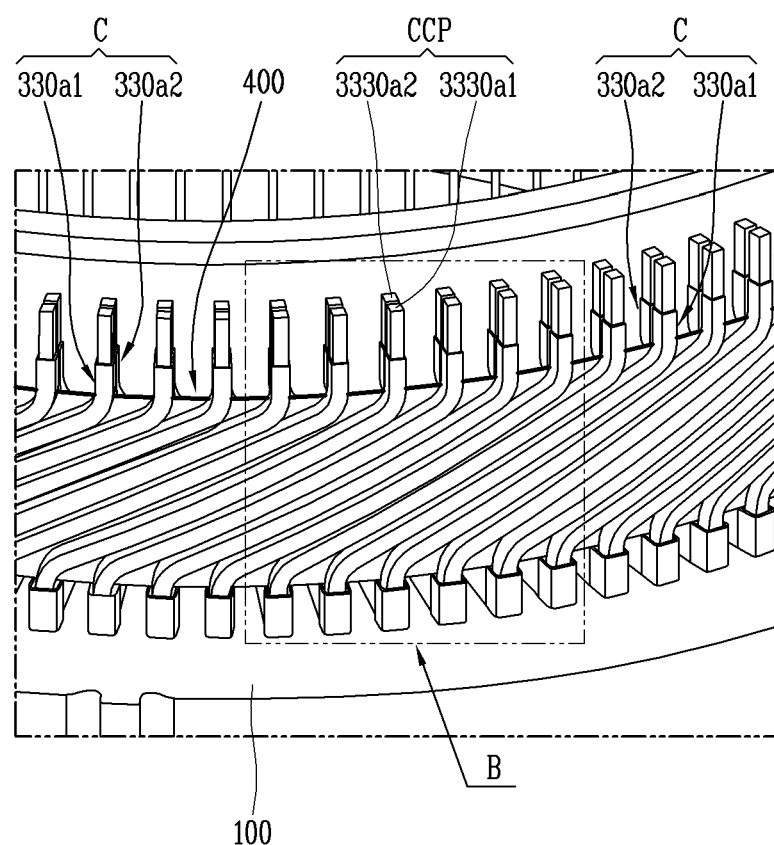
FIG. 14 is an enlarged perspective view of the stator core of FIG. 1.

FIG. 14 is an enlarged perspective view of the stator core of FIG. 1.

Referring to FIG. 14, the first insulating member 400 disposed between the first protruding part 330a1 and the second protruding part 330a2 is illustrated.

The first protruding parts 330a1 may protrude from the eighth layers 118 of the plurality of slots 110, and the second protruding parts 330a2 may protrude from the seventh layers 117 of the plurality of slots 110.

The first protruding part 330a1 and the second protruding part 330a2 may be provided in plurality along the circumferential direction of the stator core 100.

The first protruding part 330a1 protruding from any one slot 110 and the second protruding part 330a2 protruding from another slot 110 may be coupled to each other to form a coil pair C. The one slot 110 and the another slot 110 may be spaced apart by a predetermined interval. In one implementation, the predetermined interval may be a 12-slot pitch.

Since the description of the process of forming the coil pairs C has been given above with reference to FIG. 10, a detailed description thereof will be omitted.

The coil pair C may be provided in plurality spaced apart from one another in the circumferential direction of the stator core 100.

Here, the first inclined portion 331a1 of one coil pair C of the plurality of coil pairs C may partially overlap the second inclined portion 331a2 of another coil pair C in the radial direction of the stator core 100. That is, a partially-overlapped overlap region OL may be generated.

In addition, the first inclined portion 331a1 of the one coil pair C may partially overlap the second inclined portions 331a2 of several other coil pairs C in the radial direction of the stator core 100.

In this implementation, ends of the first inclined portion 331a1 and the second inclined portion 331a2 forming any one coil pair C may be spaced apart from each other by a 12-slot pitch. On the other hand, an electrically-connected part CCP which is formed by coupling the first stripped portion 3330a1 and the second stripped portion 3330a2 may be spaced a 1-slot pitch apart from an electrically-connected part CCP of another coil pair C.

With the configuration, the first inclined portions 331a1 and the second inclined portions 331a2 of a plurality of different coil pairs C may protrude from a plurality of slots placed between the first inclined portion 331a1 and the second inclined portion 331a2. Accordingly, the first inclined portion 331a1 of any one coil pair C may partially overlap the second inclined portions 331a2 of the plurality of different coil pairs C in the radial direction.

That is, the overlap region OL may be generated in plurality.

In the plurality of overlap regions OL, the first inclined portions 331a1 and the second inclined portions 331a2 may be blocked by the first insulating member 400.

Specifically, the first insulating member 400 may have a predetermined length in the axial direction of the stator core 100, and the predetermined length of the first insulating member 400 may be a length which is long enough to block the first inclined portion 331a1 and the second inclined portions 331a2 from each other in all of the overlap regions OL.

That is, the first insulating member 400 may be configured to block between the first inclined portions 331a1 and the second inclined portions 331a2 in all of the overlap regions OL.

That is, insulation performance between the first inclined portions 331a1 and the second inclined portions 331a2 can be ensured in all of the overlap regions OL.

This may result in significantly reducing the probability that partial discharge occurs between the first inclined portion 331a1 and the second inclined portion 331a2 connected to different phases in the overlap region OL.

It may also be possible to significantly reduce the probability of partial discharge due to a high voltage surge between the first inclined portion 331a1 and the second inclined portion 331a2 connected to different phases, when a high voltage is applied.

In particular, it may also be possible to significantly reduce the probability of partial discharge due to a high voltage surge between the first inclined portion 331a1 and the second inclined portion 331a2 connected to different phases in the overlap region OL, when the stator 10 is started.

Specifically, when the stator 10 is started, a relatively high voltage may be distributed between the first inclined portion 331a1 and the second inclined portion 331a2 disposed in the first section 110a.

In this case, the probability of partial discharge due to a high voltage surge between the first inclined portion 331a1 and the second inclined portion 331a2 connected to different phases in the overlap region OL may be increased.

The first insulating member 400 can secure insulating performance between the first inclined portions 331a1 and the second inclined portions 331a2 in all of the overlap regions OL, which may result in significantly reducing the probability of the partial discharge due to the high voltage surge when the stator 10 is started.

Figure 15:
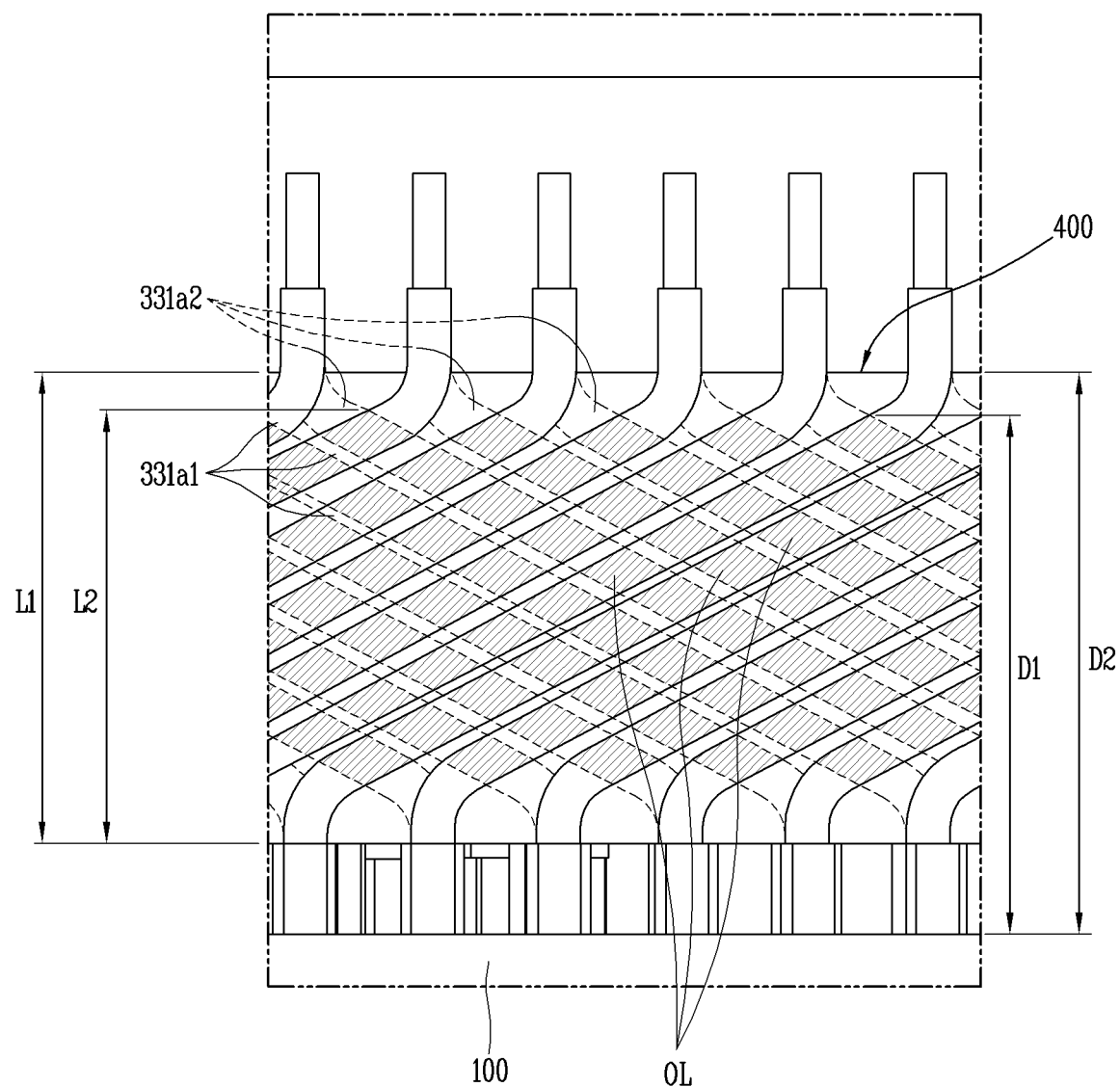
FIG. 15 is a front view illustrating an area B of FIG. 14.

FIG. 15 is a front view illustrating an area B of FIG. 14.

Referring to FIG. 15, a plurality of overlap regions OL formed by the overlap between the first inclined portions 331a1 and the second inclined portions 331a2 in the radial direction of the stator core 100 is illustrated.

In the illustrated implementation, the first insulating member 400 may have a predetermined height (or length) L1 in the axial direction of the stator core 100.

In addition, a portion of each of the overlap regions OL, which is located farthest from the stator core 100, and a portion of each of the inclined portions 331a1 and 331a2, which is most adjacent to the stator core 100, may be spaced apart from each other by a predetermined distance (or length) L2.

In one implementation, the predetermined height L1 may be equal to or larger than the predetermined distance L2.

Accordingly, the first inclined portions 331a1 and the second inclined portions 331a2 can be blocked from each other in all of the overlap regions OL.

This may result in securing insulation performance between the first inclined portions 331a1 and the second inclined portions 331a2 in all of the overlap regions OL.

It may thusly be possible to significantly reduce the probability of partial discharge due to a high voltage surge between the first inclined portions 331a1 and the second inclined portions 331a2 in all of the overlap regions OL.

In addition, a portion of each of the plurality of overlap regions OL, which is located farthest from one side surface of the stator core 100, may be spaced apart from the one side surface of the stator core 100 by a first distance D1.

In addition, one side of the first insulating member 400, which is located farthest away from the stator core 100, may be spaced apart from the one side surface of the stator core by a second distance D2.

Here, the second distance D2 may be equal to or longer than the first distance D1.

In other words, the portion of each of the plurality of overlap regions OL, which is located farthest from the one side surface of the stator core 100, may be closer to the stator core 100 than the one side of the insulating member 400, which is located farthest away from the stator core 100.

Accordingly, the first inclined portions 331a1 and the second inclined portions 331a2 can be blocked from each other in all of the overlap regions OL.

This may result in securing insulation performance between the first inclined portions 331a1 and the second inclined portions 331a2 in all of the overlap regions OL.

It may thusly be possible to significantly reduce the probability of partial discharge due to a high voltage surge between the first inclined portions 331a1 and the second inclined portions 331a2 in all of the overlap regions OL.

Figure 16:
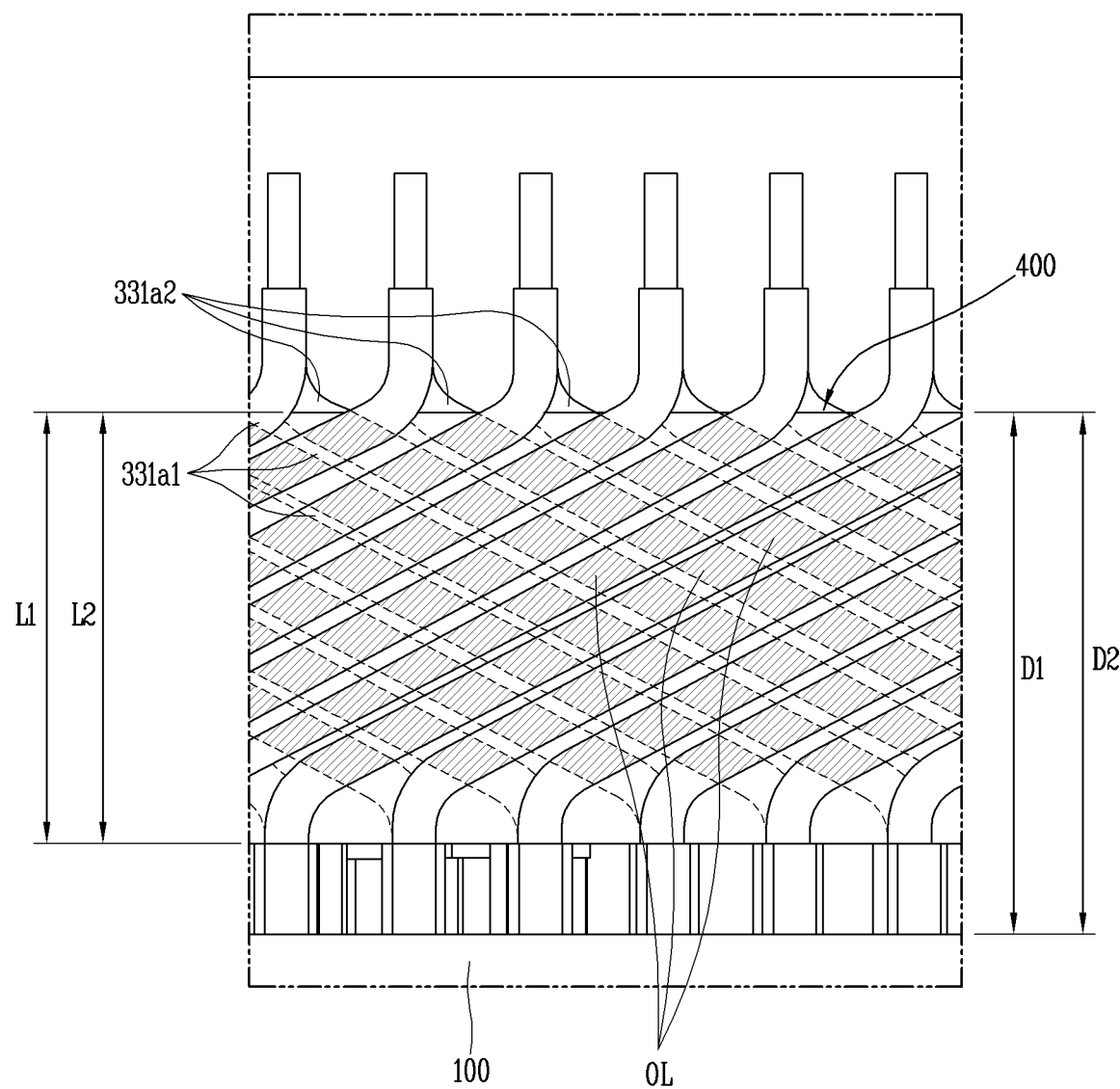
FIG. 16 is a front view illustrating another implementation of the insulating member of FIG. 15.

FIG. 16 is a front view illustrating another implementation of the insulating member 400 of FIG. 15.

Referring to FIG. 16, the height L1 of the first insulating member 400 in the axial direction may be equal to the predetermined distance L2.

Here, the second distance D2 may be equal to the first distance D1.

Accordingly, the first inclined portions 331a1 and the second inclined portions 331a2 can be blocked from each other in all of the overlap regions OL and the size of the first insulating member 400 can be reduced.

This may result in suppressing an occurrence of partial discharge and simultaneously reducing production cost of the first insulating member 400.

This may also result in suppressing the occurrence of the partial discharge and simultaneously reducing production cost of the stator 10.

Figure 17:
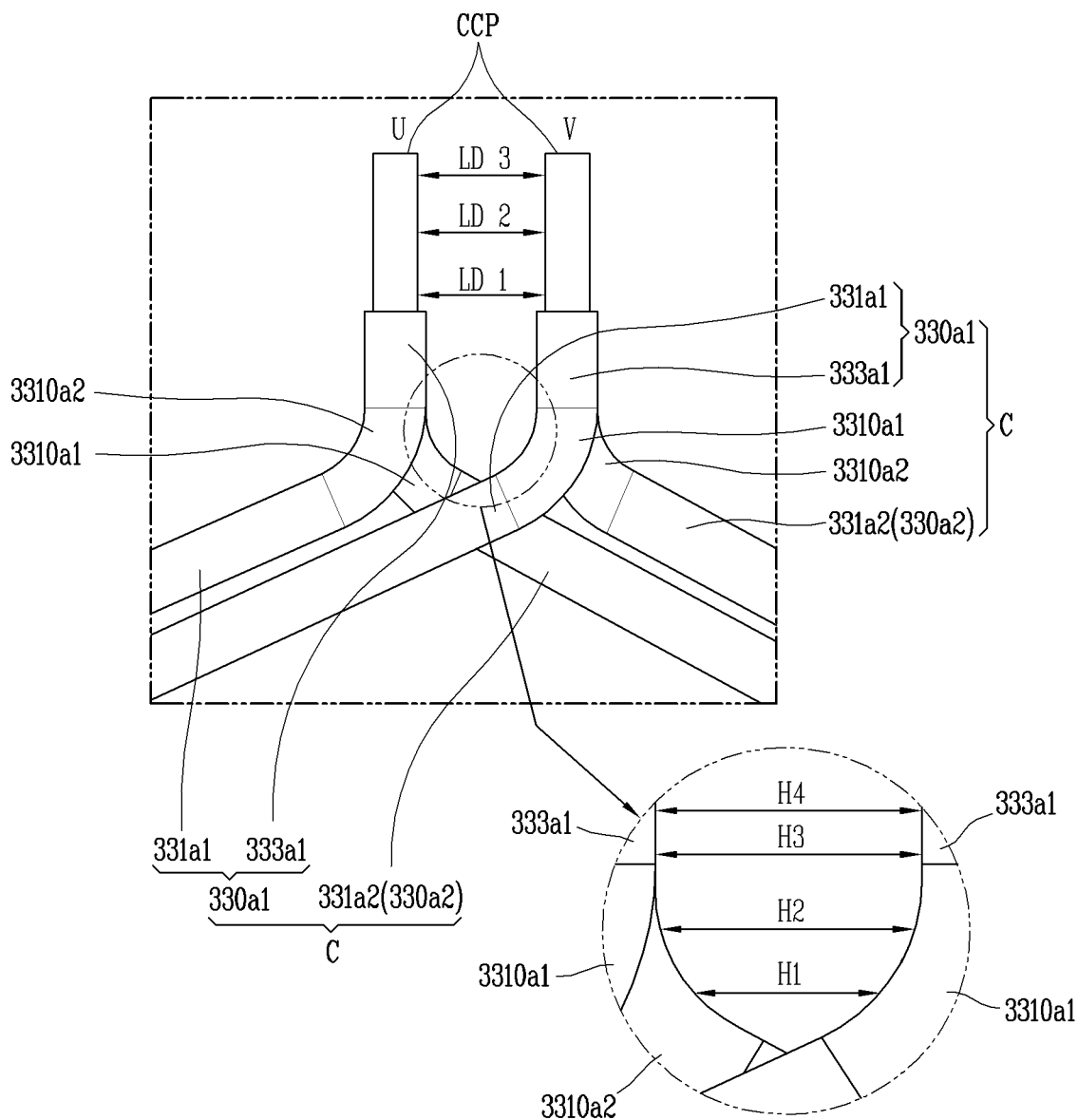
FIG. 17 is a front view illustrating a coupled portion of the hairpins of FIG. 10.

FIG. 17 is a front view illustrating a coupled portion of the hairpins of FIG. 10.

Referring to FIG. 17, two coil pairs C adjacent to each other along the circumferential direction are shown.

One of the first protruding parts 330a1 of the first hairpins 300a and the second protruding part 330a2 spaced apart by a predetermined slot pitch from the one first protruding part 330a1 may be coupled to each other to form a coil pair C. In one implementation, the predetermined slot pitch may be a 12-slot pitch.

The coil pair C may be formed in plurality along the circumferential direction of the stator core 100, and the electrically-connected parts CCP of the coil pairs C which are adjacent in the circumferential direction may be spaced apart from each other by a predetermined slot pitch. In one implementation, the predetermined slot pitch may be a 1-slot pitch.

A detailed description of the coupling structure of the coil pairs C has been given with reference to FIG. 10, and thus will not be repeated.

Power of different phases may be applied to two electrically-connected parts CCP adjacent to each other in the circumferential direction of the stator core 100. When a distance between the two electrically-connected parts CCP is varied, a vulnerable portion at which the two electrically-connected parts CCP are closest to each other may be generated. Since insulating performance at the electrically-connected part CCP is deteriorated due to the removal of the insulating coating film 303a, the probability of an occurrence of insulation breakdown due to discharge at the vulnerable portion may be increased.

In consideration of this point, the distance between the two electrically-connected parts CCP adjacent to each other in the circumferential direction of the stator core 100 may be maintained to be approximately constant.

A shortest distance between portions of the two electrically-connected parts CCP, which are spaced the same distance apart from the one side surface of the stator core 100, may be maintained to be approximately constant.

Specifically, when randomly designating first, second, and third portions on each of the two electrically-connected parts CCP sequentially in a direction away from the stator core 100 along the axial direction, the shortest distance between the two electrically-connected parts CCP at each portion may be maintained constantly.

In other words, the shortest distance LD1 between the first portions, the shortest distance LD2 between the second portions, and the shortest distance LD3 between the third portions may be approximately constant.

The two electrically-connected parts CCP adjacent to each other in the circumferential direction of the stator core 100 may have surfaces facing each other, and the shortest distances LD1, LD2, and LD3 refer to the shortest distances between portions of the surfaces facing each other, which are located axially at the same height.

Difference values among the shortest distances LD1, LD2, and LD3 between the designated parts may be set to be included within a preset range value.

In one implementation, considering a manufacturing error that may occur when forming the electrically-connected part CCP, the preset range value may be set to 1 mm or less.

In addition, in one implementation, the preset range value may preferably be set to 0.5 mm or less.

With the configuration, since the distance between the two electrically-connected parts CCP adjacent to each other in the circumferential direction of the stator core 100 is maintained to be approximately constant, the generation of the vulnerable portion, at which the two electrically-connected parts are relatively closer to each other, compared to other portions, can be suppressed. Accordingly, the possibility that insulation breakdown occurs between the two electrically-connected parts CCP adjacent to each other in the circumferential direction of the stator core 100 can be significantly reduced.

Hereinafter, the above structure will be described in more detail.

Of two coil pairs C adjacent to each other in the circumferential direction of the stator core 100, the second inclined portion 331a2 of any one coil pair C and the first inclined portion 331a1 of the other coil pair C may partially overlap in the radial direction by intersecting with each other.

Between the partially-overlapped portion and the wire connection portion 333a1, 333a2, the second inclined portion 331a2 and the first inclined portion 331a1 may be gradually closer to each other toward the overlapped portion.

Specifically, one curved end 3310a2 of the second inclined portion 331a2 and one curved end 3310a1 of the first inclined portion 331a1 may gradually become close to each other toward the overlapped portion.

In other words, a shortest distance H1 between the one curved end 3310a2 of the second inclined portion 331a2 and the one curved end 3310a1 of the first inclined portion 331a1 at one position may be shorter than a shortest distance H2 at another position farther away from the overlapped portion than the one position.

On the other hand, since the wire connection portions 333a1 and 333a2 extend approximately in parallel to each other in the axial direction from the inclined portions 331a1 and 3331a2, respectively, distances H3 and H4 between the two adjacent wire connection portions 333a1 and 333a2 at different positions may be approximately the same.

When the stripped portions 3330a1 and 3330a2 forming the electrically-connected parts CCPs are formed up to the wire connection portions 333a1 and 333a2 including the respective wire connection portions 333a1 and 333a2, a vulnerable portion at which the electrically-connected parts CCPs are excessively adjacent to each other may be generated.

On the other hand, when the stripped portions 3330a1 and 3330a2 forming the electrically-connected parts CCP are formed on the wire connection portions 333a1 and 333a2, respectively, the distance between the two wire connection parts CCP may be approximately constant, thereby suppressing the generation of the vulnerable portion. Accordingly, the possibility that insulation breakdown occurs between two electrically-connected parts CCP adjacent to each other in the circumferential direction of the stator core 100 can be significantly reduced.

That is, among the plurality of electrically-connected parts CCPs, portions of two adjacent electrically-connected parts CCPs, which are located at the same distances from the one side surface of the stator core 100, may have the shortest distances LD1, LD2, and LD3, which may be set to have difference values included in a preset range value. With this configuration, the generation of the vulnerable portion at which the two electrically-connected parts CCPs are excessively adjacent to each other can be suppressed and the probability of an occurrence of insulation breakdown can be significantly reduced.

In one implementation, considering a manufacturing error that may occur when forming the electrically-connected part CCP, the preset range value may be set to 1 mm or less.

In addition, in one implementation, the preset range value may preferably be set to 0.5 mm or less.

Figure 18:
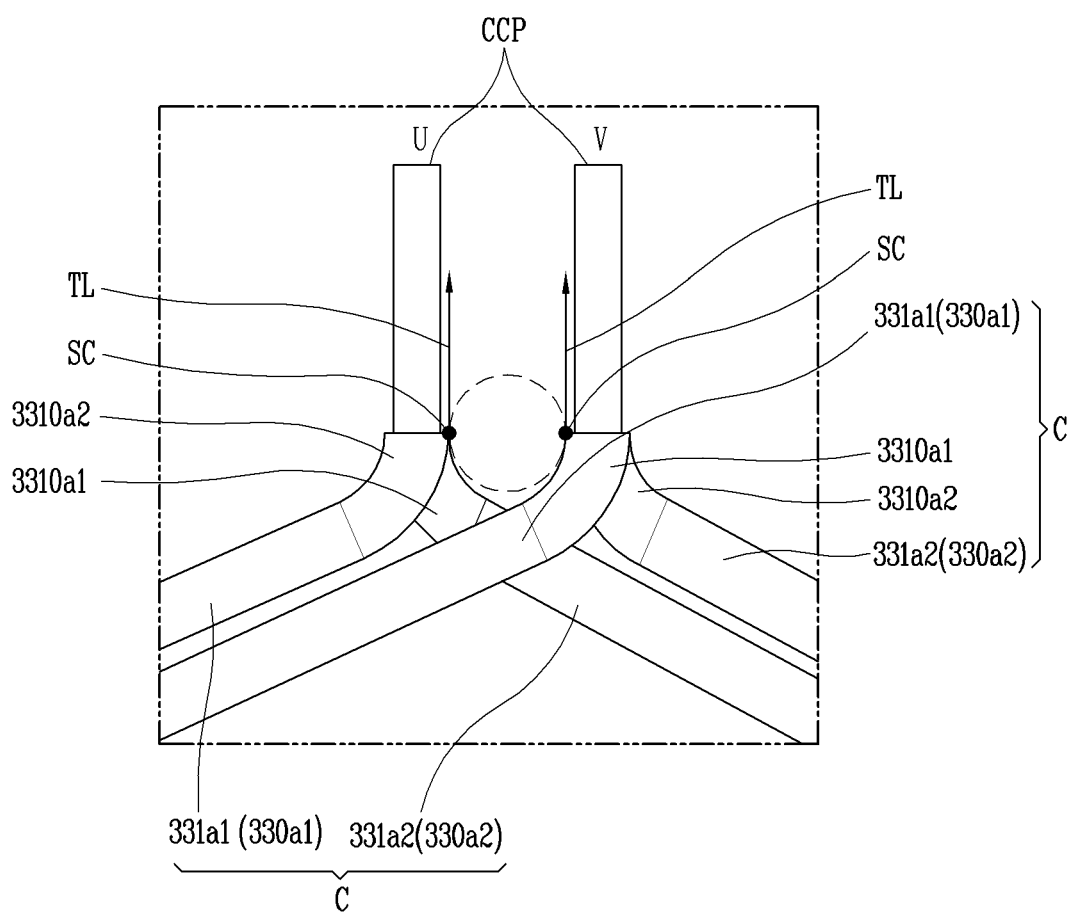
FIG. 18 is a front view illustrating a state in which an electrically-connected part of FIG. 17 has a maximum length.

FIG. 18 is a front view illustrating a state in which the electrically-connected part CCP of FIG. 17 has a maximum length.

Referring to FIG. 18, the electrically-connected parts CCP may extend from portions, at which the curved ends 3310a1 and 3310a2 of the inclined portions 331a1 and 331a2 are ended, in a direction away from the slot 110.

The electrically-connected part CCP may be formed by coupling the first stripped portion 3330a1 and the second stripped portion 3330a2.

When the first stripped portion 3330a1 and the second stripped portion 3330a2 are formed up to the curved ends 3310a1 and 3310a2 of the inclined portions 331a1 and 331a2 over the wire connection parts 333a1 and 333a2, the vulnerable portion at which the two adjacent electrically-connected parts CCPs are excessively adjacent to each other may be generated. The description of the generation of the vulnerable portion has been described above, and thus will not be repeated.

Therefore, the first stripped portion 3330a1 and the second stripped portion 3330a2 may preferably be formed within a range in which the respective wire connection portions 333a1 and 333a2 are formed.

That is, the first stripped portion 3330a1 and the second stripped portion 3330a2 may be located to be farther from the slot 110 than portions where the curved ends 3310a1 and 3310a2 of the inclined portions 331a1 and 331a2 are ended.

In other words, the first stripped portion 3330a1 and the second stripped portion 3330a2 may be located to be farther from the slot 110 than portions where the curved ends 3310a1 and 3310a2 of the inclined portions 331a1 and 331a2 are connected to the wire connection portions 333a1 and 333a2.

Each portion where the curved ends 3310a1 and 3310a2 of the inclined portions 331a1 and 331a2 are connected to the wire connection portions 333a1 and 333a2 may be a stripping criterion point SC for determining whether or not a vulnerable portion is to be generated.

When the first stripped portion 3330a1 and the second stripped portion 3330a2 are located farther from the slot 110 than the stripping criterion point SC, the generation of the vulnerable portion may be suppressed. On the other hand, when the first stripped portion 3330a1 and the second stripped portion 3330a2 are located closer to the slot 110 than the stripping criterion point SC, a vulnerable portion may be generated.

That is, the first stripped portion 3330a1 and the second stripped portion 3330a2 may preferably be located farther from the slot 110 than the stripping criterion point SC.

In other words, the first stripped portion 3330a1 and the second stripped portion 3330a2 may preferably be arranged in a direction of a virtual tangent line TL which comes in contact with the stripping criterion point SC.

In the illustrated implementation, the first stripped portion 3330a1 and the second stripped portion 3330a2 are formed to have the maximum length. The first stripped portion 3330a1 and the second stripped portion 3330a2 may extend from portions, at which the curved ends 3310a1 and 3310a2 of the inclined portions 331a1 and 331a2 are ended, in a direction away from the slot 110. That is, the first stripped portion 3330a1 and the second stripped portion 3330a2 may extend from the reference criterion point SC in the direction away from the slot 110.

Figure 19:
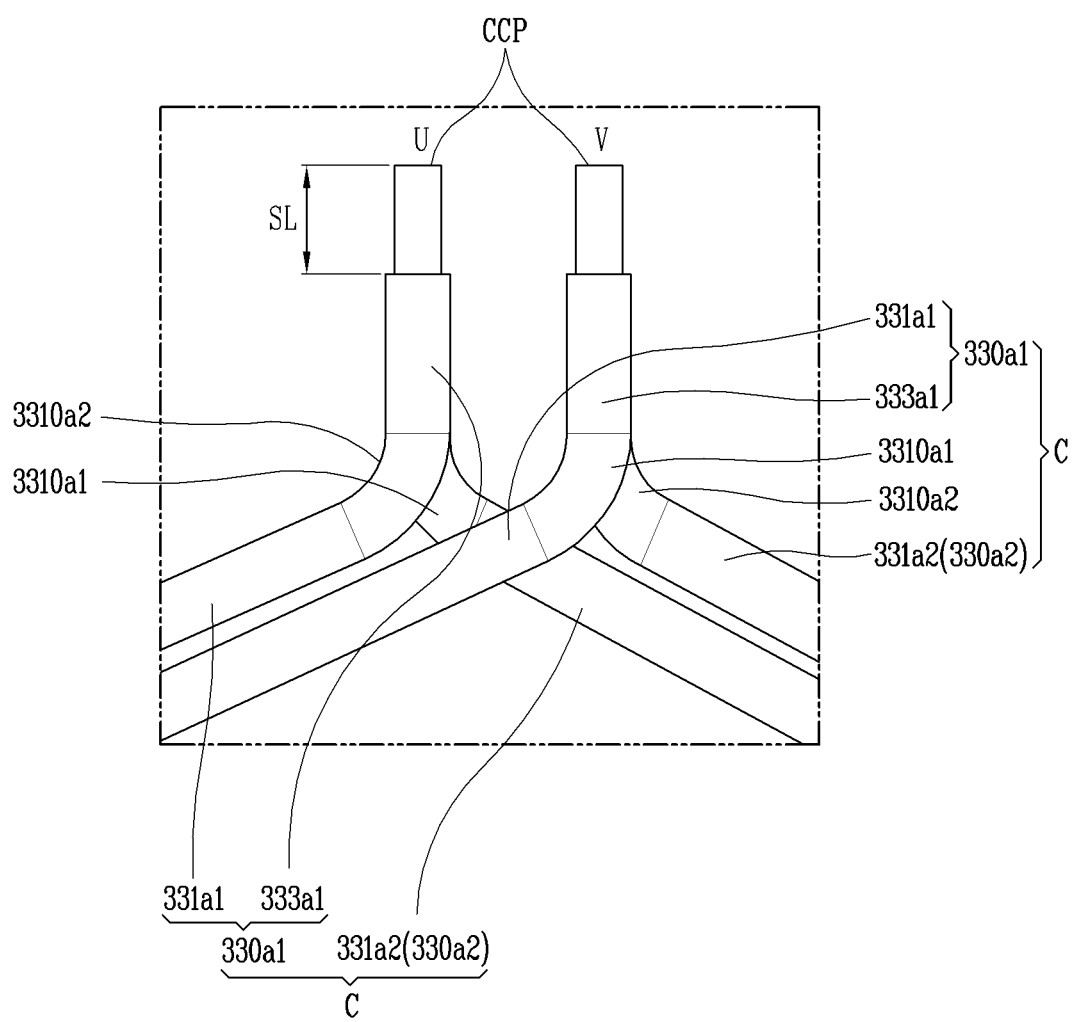
FIG. 19 is a front view illustrating another implementation of a stripped portion of FIG. 17.

FIG. 19 is a front view illustrating another implementation of a stripped portion of FIG. 17.

In the illustrated implementation, the stripped portions 3330a1 and 3330a2 are formed to be shorter than the stripped portions 3330a1 and 3330a2 illustrated in FIG. 17.

The stripped portions 3330a1 and 3330a2 forming the electrically-connected parts CCPs may be formed by removing the insulating coating film 303a from the first hairpin 300a by a predetermined length. The predetermined length may be defined as "stripping length SL".

When the insulating coating film 303a is removed, the conductor 301a is exposed and the insulating performance is deteriorated. Therefore, the stripping length SL may preferably be set to be as short as possible, such that an exposed area of the conductor 301a can be reduced.

However, since the two different stripped portions 3330 are welded to each other at a predetermined temperature, the stripping length SL may preferably be set in consideration of damage to the insulating coating film 303a that may occur during the welding. The predetermined temperature may be defined as "welding temperature". In one implementation, the welding temperature may be a high temperature of 950° C. or higher.

The insulating coating film 303a covering the outer surface of the conductor 301a may be formed of a material having excellent heat resistance, electrical insulation property, and elongation. In one implementation, the insulating coating film 303a may be formed of polyimide (PI).

However, when the welding temperature is excessively high, a change in characteristics of the insulating coating film 303a may occur, which may cause problems such as damage to the electrical insulation property of the insulating coating film 303a, and the like. In one implementation, the change in characteristics of the insulating coating film 303a may occur at a high temperature of 500° C. or higher.

In regard to this, the stripping length SL may preferably be set to be as short as possible in consideration of the possibility of damage to the insulating coating film 303a adjacent to the stripped portions 3330a1 and 3330a2 at the welding temperature.

That is, the stripping length SL may be set to be as short as possible while reducing damage to the adjacent insulating coating film 303a during the welding at the welding temperature.

In one implementation, the stripping length SL may be set to be in the range of 4 mm to 6 mm at a welding temperature of 900° C. or higher.

When the stripping length SL is set in the range of 4 mm to 6 mm, damage to the insulating coating film 303a adjacent to the first stripped portion 3330a1 and the second stripped portion 3330a2 may be suppressed when welding at a welding temperature of 900° C. or higher. Accordingly, the damage to the insulating coating film 303a during the welding can be suppressed and simultaneously an exposed area of the conductor 301a can be reduced, thereby improving insulation performance of the electrically-connected part CCP.

In one implementation, the stripping length SL may be set to be in the range of 5 mm to 7 mm at a welding temperature of 950° C. or higher.

When the stripping length SL is set in the range of 5 mm to 7 mm, damage to the insulating coating film 303a adjacent to the first stripped portion 3330a1 and the second stripped portion 3330a2 may be suppressed when welding at a welding temperature of 950° C. or higher. Accordingly, the damage to the insulating coating film 303a during the welding can be suppressed and simultaneously an exposed area of the conductor 301a can be reduced, thereby improving insulation performance of the electrically-connected part CCP.

In the illustrated drawing, the coil pair C of the first hairpin 300a has been described as an example, but the positions where the stripped portions 3330a1 and 3330a2 are formed and their stripping length SL will be equally applied even to the coil pair C of the second hairpin 300b.

Figure 20:
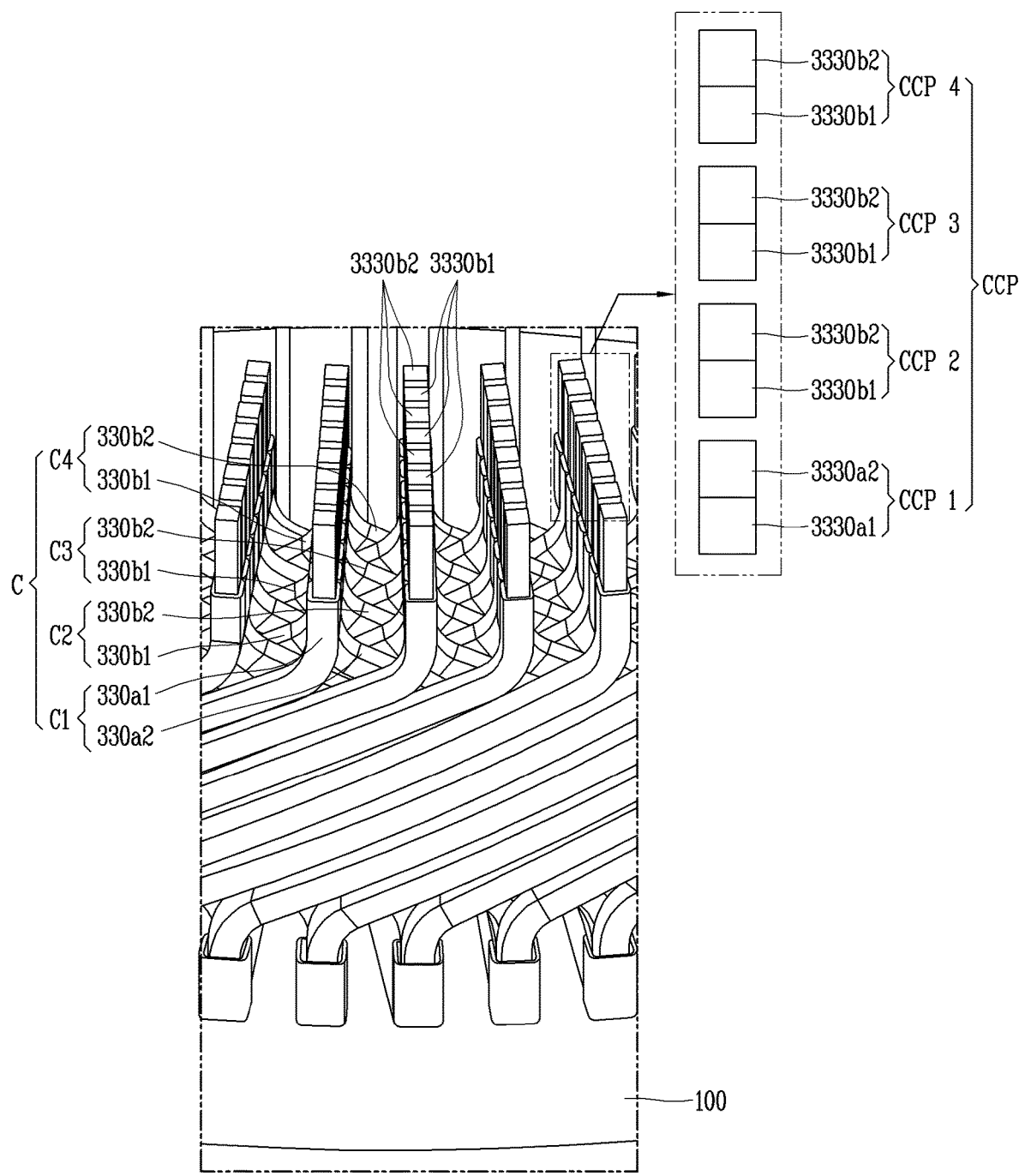
FIG. 20 is a perspective view illustrating a coupling structure of hairpins.

FIG. 20 is a perspective view illustrating a coupling structure of hairpins.

Referring to FIG. 20, a plurality of coil pairs C may be provided in plural along the radial direction of the stator core 100.

The plurality of coil pairs C may include a first coil pair C1, a second coil pair C2, a third coil pair C3, and a fourth coil pair C4. The first coil pair C1, the second coil pair C2, the third coil pair C3, and the fourth coil pair C4 may be sequentially arranged from outermost to innermost sides in the radial direction of the stator core 100.

Specifically, the first protruding part 330a1 and the second protruding part 330a2 protruding from the eighth layer 118 and the seventh layer 117, respectively, may be coupled to each other to form the first coil pair C1.

The first protruding part 330b1 and the second protruding part 330b2 protruding from the sixth layer 116 and the fifth layer 115, respectively, may be coupled to each other to form the second coil pair C2.

The first protruding part 330b1 and the second protruding part 330b2 protruding from the fourth layer 114 and the third layer 113, respectively, may be coupled to each other to form the third coil pair C3.

The first protruding part 330b1 and the second protruding part 330b2 protruding from the second layer 112 and the first layer 111, respectively, may be coupled to each other to form the fourth coil pair C4.

The first coil pair C1 may have a first electrically-connected part CCP1 formed by coupling the stripped portions 3330a1 and 3330a2, and the second and third coil pairs C2 and C3 may have a second electrically-connected part CCP2 and a third electrically-connected part CCP3, respectively, formed by coupling the stripped portions 3330b1 and 3330b2.

The first electrically-connected part CCP1, the second electrically-connected part CCP2, the third electrically-connected part CCP3, and the fourth electrically-connected part CCP4 may be disposed to overlap one another in the radial direction of the stator core 100.

If different phases are connected to two adjacent electrically-connected parts CCP among the first to fourth electrically-connected parts CCP1 to CCP4, insulation breakdown may occur. Accordingly, a second insulating member 500 may be disposed between two adjacent electrically-connected parts CCP among the first to fourth electrically-connected parts CCP1 to CCP4 so as to insulate between the two adjacent electrically-connected parts CCP.

In the illustrated implementation, the four coil pairs C are provided along the radial direction of the stator core 100, but this may vary depending on the size and wire connection structure of the stator core 100.

Figure 21:
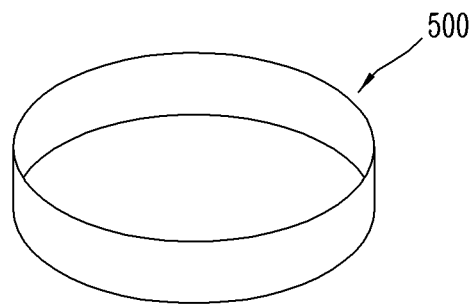
FIG. 21 is a perspective view of an insulating member of FIG. 1.
Figure 22:
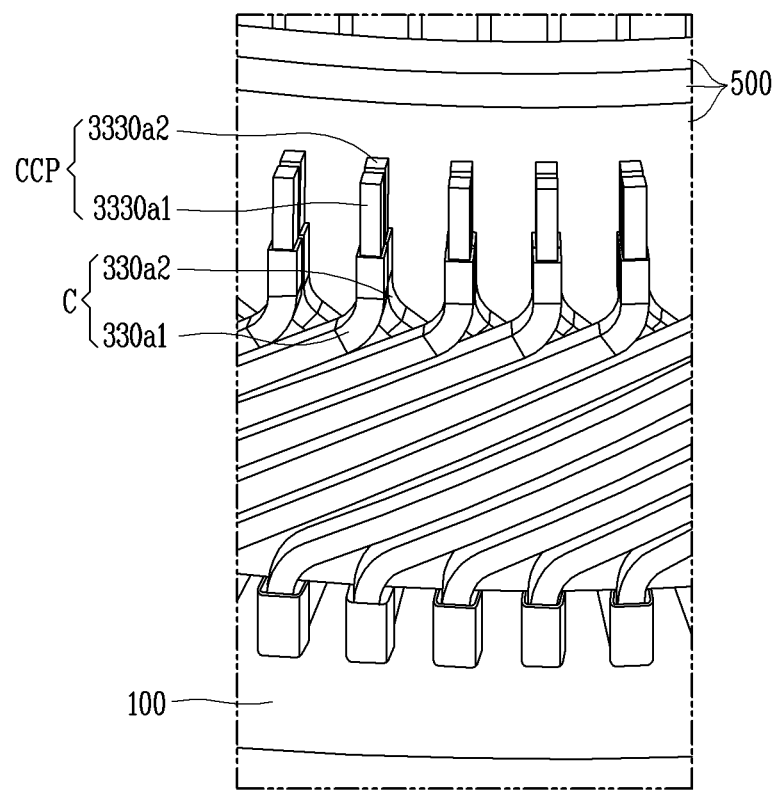
FIG. 22 is an enlarged perspective view of the stator core of FIG. 1.

FIG. 21 is a perspective view of an insulating member 500 of FIG. 1. FIG. 22 is an enlarged perspective view of the stator core of FIG. 1.

Referring to FIGS. 21 and 22, a second insulating member 500 which is configured to insulate between coil pairs C adjacent to each other in the radial direction of the stator core 100 is illustrated.

The second insulating member 500 may be provided in plurality. The plurality of second insulating members 500 may be disposed between the first coil pair C1 and a second coil pair C2, between the second coil pair C2 and the third coil pair C3, and between the third coil pair C3 and the fourth coil pair C4, respectively.

The second insulating member 500 may have an annular cross-section and extend by a predetermined length along the axial direction of the stator core 100. The predetermined length may be a length which is long enough to insulate between electrically-connected parts CCPs adjacent to each other in the radial direction of the stator core 100.

In one implementation, the predetermined length may be longer than an axial length of the coil pair C.

In addition, in one implementation, the predetermined length may be longer than a distance between a portion of the electrically-connected part CCP, which is farthest from one side surface of the stator core 100, and the one side surface of the stator core 100.

This may result in remarkably reducing the probability of an occurrence of insulation breakdown between the coil pairs C adjacent to each other in the radial direction of the stator core 100.

In one implementation, the second insulating member 500 may be configured as a member having insulating property.

In one implementation, the second insulating member 500 may be formed in a closed-loop shape extending along the circumferential direction of the stator core 100.

In one implementation, the second insulating member 500 may have a thickness which is substantially uniform in the radial direction of the stator core 100.

Figure 23:
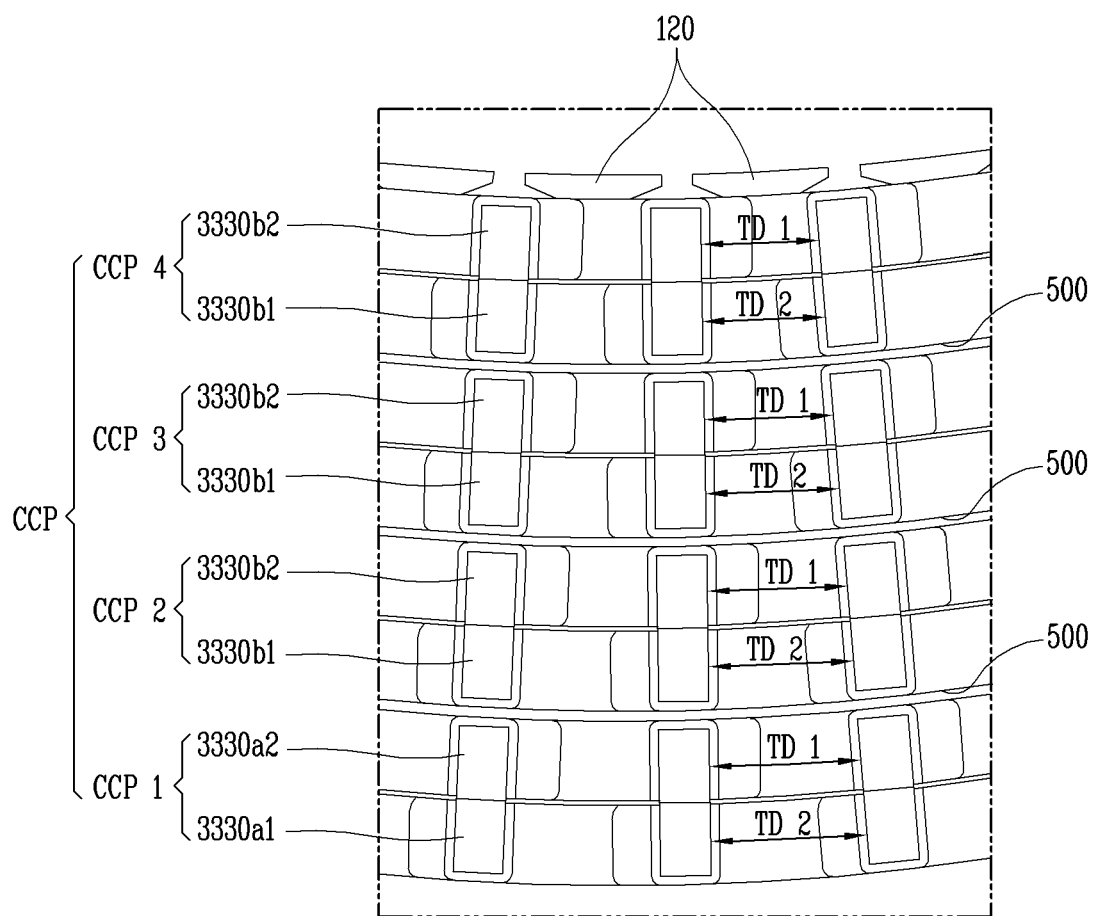
FIG. 23 is a planar view of the stator core of FIG. 22, viewed from the top.

FIG. 23 is a planar view of the stator core of FIG. 22, viewed from the top.

Referring to FIG. 23, a plurality of electrically-connected parts CCPs provided in the circumferential direction and the radial direction of the stator core 100 is illustrated.

The second insulating member 500 may be disposed provided between the electrically-connected parts CCPs adjacent to each other in the radial direction of the stator core 100.

For example, the second insulating members 400 may be disposed between the first electrically-connected part CCP1 and the second electrically-connected part CCP2, between the second electrically-connected part CCP2 and the third electrically-connected part CCP3, and the third electrically-connected part CCP3 and the fourth electrically-connected part CCP4, respectively. With the configuration, insulation performance between two electrically-connected parts CCP adjacent to each other in the radial direction of the stator core 100 can be secured.

In addition, the distance between the two electrically-connected parts CCP adjacent to each other in the circumferential direction of the stator core 100 may be maintained to be approximately constant.

The two electrically-connected parts CCPs adjacent to each other in the circumferential direction of the stator core 100 may have surfaces facing each other. A shortest distance between portions of the surfaces facing each other, which are located at the same distance from a central axis of the stator core 100, may be maintained to be approximately constant.

Of portions of the surfaces facing each other, adjacent to each other in the circumferential direction, a shortest distance TD1 between first portions located at a first distance from the central axis of the stator core 100 may be approximately the same as a shortest distance TD2 between second portions located at a second distance from the central axis of the stator core 100.

In addition, of the portions of the two surfaces facing each other, adjacent to each other in the circumferential direction, the shortest distances between portions located at the same distance from the central axis of the stator core 100 may have a difference value included in a preset range value.

In one implementation, considering a manufacturing error that may occur when forming the electrically-connected part CCP, the preset range value may be set to 1 mm or less.

In addition, in one implementation, the preset range value may preferably be set to 0.5 mm or less.

Although the foregoing description has been given with reference to the preferred implementations of the present disclosure, it will be understood that those skilled in the art can variously modify and change the present disclosure without departing from the scope disclosed in the appended claims.

What is claimed is:

1. A stator for a rotating electric machine, the stator comprising:
    a stator core defining a plurality of slots; and
    a stator coil coupled to the stator core and comprising a plurality of hairpins that are electrically connected to each other and inserted into the slots in a preset pattern,
    wherein the plurality of hairpins include voltage distribution hairpins that are disposed at a voltage distribution section of the stator, the voltage distribution section being positioned radially away from a power input part of the stator,
    wherein the voltage distribution hairpins include a plurality of first protruding parts and a plurality of second protruding parts that each protrude axially away from the stator core, corresponding ones of the first and second protruding parts being electrically coupled to each other to form a plurality of coil pairs,
    wherein an insulating member is disposed between the first protruding parts and the second protruding parts to thereby provide electrical insulation between the first protruding parts and the second protruding parts that are not electrically coupled to each other,
    wherein a first protruding part of the plurality of first protruding parts and a second protruding part of the plurality of second protruding parts protrude from different ones of the plurality of slots, the first protruding part and the second protruding part corresponding to each other to form one of the plurality of coil pairs,
    wherein the plurality of coil pairs are spaced apart from each other along a circumferential direction of the stator core,
    wherein the first protruding part that forms the one of the plurality of coil pairs comprises:
        a first inclined portion extending in a first circumferential direction of the stator core at a predetermined angle relative to an axial side surface of the stator, and
        a first wire connection portion extending from one end of the first inclined portion away from the plurality of slots,
    wherein the second protruding part that forms the one of the plurality of coil pairs comprises:
        a second inclined portion extending in a second circumferential direction of the stator core opposite the first circumferential direction at a predetermined angle relative to the axial side surface of the stator core, and
        a second wire connection portion (i) extending from one end of the second inclined portion in a direction away from the plurality of slots and (ii) being electrically coupled to the first wire connection portion, and
    wherein the first inclined portion of the one of the plurality of coil pairs forms an overlap region by partially overlapping a second inclined portion of another of the plurality of coil pairs along a radial direction of the stator core.

2. The stator of claim 1, wherein the plurality of first protruding parts are located at a radially outermost portion of the plurality of slots, and
    wherein the plurality of second protruding parts is located adjacent to the plurality of first protruding parts at a radially inner side of the plurality of first protruding parts.

3. The stator of claim 1, wherein among portions of the first inclined portion and the second inclined portion that partially overlap each other, a first distance between overlapping portions located axially farthest away from the stator core and the axial side surface of the stator core is less than a second distance between an axially outermost side of the insulating member and the axial side surface of the stator core.

4. The stator of claim 1, wherein one of the plurality of coil pairs forms an overlap region by partially overlapping another one of the plurality of coil pairs along a radial direction of the stator core, and
    wherein among portions of the overlap region, a first distance between a portion of the overlap region located axially farthest away from the stator core and an axial side surface of the stator core is less than a second distance between an axially outermost side of the insulating member and the axial side surface of the stator core.

5. The stator of claim 1, wherein among portions of the overlap region, a portion of the overlap region located axially farthest away from the stator core is spaced apart from the stator core by a first distance,
    wherein an axially outermost side of the insulating member is spaced apart from the stator core by a second distance, and
    wherein the first distance is equal to or less than the second distance.

6. The stator of claim 1, wherein the insulating member has an annular shape and extends along a circumferential direction of the stator core.

7. The stator of claim 1, wherein the stator coil includes first to n-th coil parts each having a plurality of hairpins, and
    wherein the first coil part includes the voltage distribution hairpins.

8. The stator of claim 1, wherein the stator coil includes first to n-th coil parts each having a plurality of hairpins, and
    wherein the first coil part and a second coil part connected to the first coil part are each provided with the voltage distribution hairpins.

9. The stator of claim 1, wherein the stator coil includes first to n-th coil parts each having a plurality of hairpins, and
    wherein the voltage distribution section includes the first coil part having a voltage distribution ratio of 60% or higher.

10. The stator of claim 1, wherein the stator coil includes first to n-th coil parts each having a plurality of hairpins, and
    wherein the voltage distribution section includes the first coil part having a voltage distribution ratio of 50% or higher and a second coil part connected to the first coil part.

11. A stator for a rotating electric machine, the stator comprising:
- a stator core defining a plurality of slots; and
- a stator coil coupled to the stator core and comprising a plurality of hairpins that are electrically connected to each other and inserted, respectively, through the plurality of slots,
- wherein the stator coil includes a plurality of protruding parts protruding in a direction away from the plurality of slots and spaced apart from each other along a radial direction of the stator core,
- wherein the plurality of protruding parts comprises:
  - a plurality of first protruding parts located at a radially outermost portion of the plurality of slots; and
  - a plurality of second protruding parts located adjacent to the plurality of first protruding parts at a radially inner side of the plurality of first protruding parts,
- wherein at least some of the plurality of first protruding parts are electrically connected to an external power source,
- wherein an insulating member is disposed between the first protruding parts and the second protruding parts to thereby provide electrical insulation between certain ones of the first protruding parts and the second protruding parts,
- wherein remaining first protruding parts of the plurality of first protruding parts are coupled to the plurality of second protruding parts, respectively, to form a plurality of coil pairs,
- wherein a first protruding part of the plurality of first protruding parts and a second protruding part of the plurality of second protruding parts protrude from different ones of the plurality of slots, the first protruding part and the second protruding part corresponding to each other to form one of the plurality of coil pairs,
- wherein the plurality of coil pairs are spaced apart from each other along a circumferential direction of the stator core,
- wherein the first protruding part that forms the one of the plurality of coil pairs comprises:
  - a first inclined portion extending in a first circumferential direction of the stator core at a predetermined angle relative to an axial side surface of the stator, and
  - a first wire connection portion extending from one end of the first inclined portion in a away from the plurality of slots,
- wherein the second protruding part that forms the one of the plurality of coil pairs comprises:
  - a second inclined portion extending in a second circumferential direction of the stator core opposite the first circumferential direction at a predetermined angle relative to the axial side surface of the stator core, and
  - a second wire connection portion (i) extending from one end of the second inclined portion in a direction away from the plurality of slots and (ii) being electrically coupled to the first wire connection portion, and
- wherein the first inclined portion of the one of the plurality of coil pairs forms an overlap region by partially overlapping a second inclined portion of another of the plurality of coil pairs along a radial direction of the stator core.

12. The stator of claim 11, wherein each of the plurality of hairpins has a substantially U-shape.

13. The stator of claim 11,
- wherein any one of the plurality of coil pairs partially overlaps another one of the plurality of coil pairs in a radial direction of the stator core, and
- wherein among portions where the one coil pair and the another coil pair of the plurality of coil pairs partially overlap each other, a portion located farthest from the stator core is located closer to the stator core than an axially outermost side of the insulating member.

14. The stator of claim 13, wherein each of the plurality of hairpins includes a conductor and an insulating coating film covering the conductor, each of the plurality of hairpins further including:
- a first stripped portion where the insulating coating film is removed from one end of each of the plurality of first protruding parts, and
- a second stripped portion where the insulating coating film is removed from one end of each of the plurality of second protruding parts.

15. The stator of claim 14, wherein the first stripped portion and the second stripped portion have a preset stripping length, and
- wherein the preset stripping length is in a range of 4 mm to 6 mm.

16. The stator of claim 14, wherein each of the plurality of hairpins includes an electrically-connected part formed by electrically coupling the first stripped portion and the second stripped portion,
- wherein the electrically-connected part is provided in plurality spaced apart from each another along a circumferential direction of the stator core, and
- wherein a distance between adjacent ones of the electrically-connected parts is constant within a preset range value along an axial direction.

17. The stator of claim 16, wherein the preset range value is 1 mm or less.

* * * * *